United States Patent
Sugeno et al.

(10) Patent No.: US 10,056,773 B2
(45) Date of Patent: Aug. 21, 2018

(54) BATTERY CONTROL DEVICE, CONTROL METHOD, CONTROL SYSTEM AND ELECTRIC VEHICLE

(71) Applicant: Murata Manufacturing Co., Ltd., Kyoto (JP)

(72) Inventors: Naoyuki Sugeno, Fukushima (JP); Kohki Watanabe, Fukushima (JP); Shuichi Takizawa, Fukushima (JP); Kenji Sato, Fukushima (JP); Koji Umetsu, Miyagi (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/646,442

(22) PCT Filed: Oct. 7, 2013

(86) PCT No.: PCT/JP2013/005951
§ 371 (c)(1),
(2) Date: May 21, 2015

(87) PCT Pub. No.: WO2014/083740
PCT Pub. Date: Jun. 5, 2014

(65) Prior Publication Data
US 2015/0295448 A1 Oct. 15, 2015

(30) Foreign Application Priority Data
Nov. 30, 2012 (JP) ................. 2012-263428

(51) Int. Cl.
*H02J 7/00* (2006.01)
*H01M 10/42* (2006.01)
(Continued)

(52) U.S. Cl.
CPC .............. *H02J 7/0063* (2013.01); *B60L 1/02* (2013.01); *B60L 3/0046* (2013.01); *B60L 7/14* (2013.01);
(Continued)

(58) Field of Classification Search
CPC ......... H01M 2008/1095; H01M 10/44; H01M 10/48; H01M 10/63; H01M 4/139;
(Continued)

(56) References Cited

U.S. PATENT DOCUMENTS 5,363,031 A * 11/1994 Miller ................ G01R 31/3655
320/115
5,572,110 A * 11/1996 Dunstan ................ H02J 7/0004
320/106
(Continued)

FOREIGN PATENT DOCUMENTS

| JP | 2006-210244 | 8/2006 |
| JP | 2009-142069 | 6/2009 |

(Continued)

OTHER PUBLICATIONS

International Search Report prepared by the European Patent Office dated Jan. 14, 2014, for International Application No. PCT/JP2013/005951.
(Continued)

*Primary Examiner* — Jelani A Smith
*Assistant Examiner* — Luis A Martinez Borrero
(74) *Attorney, Agent, or Firm* — Chip Law Group

(57) ABSTRACT

A battery package including a power storage portion; and a control device, where the control device determines if a first temperature of the power storage portion is higher than a predetermined temperature, and if the first temperature is higher than the predetermined temperature, discharges the power storage portion at a first discharge rate.

24 Claims, 13 Drawing Sheets

(51) Int. Cl.
*H01M 10/44* (2006.01)
*B60L 1/02* (2006.01)
*B60L 3/00* (2006.01)
*B60L 7/14* (2006.01)
*B60L 11/12* (2006.01)
*B60L 11/18* (2006.01)
*B60L 15/20* (2006.01)
*H02J 7/35* (2006.01)

(52) U.S. Cl.
CPC ......... *B60L 11/126* (2013.01); *B60L 11/1803* (2013.01); *B60L 11/187* (2013.01); *B60L 11/189* (2013.01); *B60L 11/1816* (2013.01); *B60L 11/1824* (2013.01); *B60L 11/1846* (2013.01); *B60L 11/1857* (2013.01); *B60L 11/1861* (2013.01); *B60L 11/1864* (2013.01); *B60L 11/1875* (2013.01); *B60L 11/1879* (2013.01); *B60L 15/2009* (2013.01); *H01M 10/425* (2013.01); *H01M 10/4207* (2013.01); *H01M 10/443* (2013.01); *H02J 7/0021* (2013.01); *H02J 7/0052* (2013.01); *H02J 7/0081* (2013.01); *H02J 7/0091* (2013.01); B60L 2200/12 (2013.01); B60L 2210/10 (2013.01); B60L 2210/40 (2013.01); B60L 2240/12 (2013.01); B60L 2240/421 (2013.01); B60L 2240/423 (2013.01); B60L 2240/441 (2013.01); B60L 2240/443 (2013.01); B60L 2240/545 (2013.01); B60L 2240/547 (2013.01); B60L 2240/549 (2013.01); B60L 2240/662 (2013.01); B60L 2240/80 (2013.01); B60L 2250/10 (2013.01); B60L 2250/16 (2013.01); H01M 2010/4271 (2013.01); H01M 2220/20 (2013.01); H02J 7/35 (2013.01); H02J 2007/005 (2013.01); H02J 2007/0067 (2013.01); H02J 2007/0098 (2013.01); Y02T 10/6217 (2013.01); Y02T 10/645 (2013.01); Y02T 10/7011 (2013.01); Y02T 10/7044 (2013.01); Y02T 10/7055 (2013.01); Y02T 10/7061 (2013.01); Y02T 10/7072 (2013.01); Y02T 10/7077 (2013.01); Y02T 10/7216 (2013.01); Y02T 10/7241 (2013.01); Y02T 10/7275 (2013.01); Y02T 10/7291 (2013.01); Y02T 90/121 (2013.01); Y02T 90/127 (2013.01); Y02T 90/128 (2013.01); Y02T 90/14 (2013.01); Y02T 90/16 (2013.01); Y02T 90/163 (2013.01); Y02T 90/169 (2013.01); Y02T 90/34 (2013.01); Y04S 30/14 (2013.01)

(58) Field of Classification Search
CPC ................ H01M 4/625; H01M 10/46; H01M 2004/021; H01M 2300/0037; H01M 4/1391; H01M 2300/0028; H01M 2220/30; H01M 2004/027; H01M 10/625; H01M 10/658; H01M 10/0587; H01M 4/386; B60L 11/1848; B60L 11/1861; B60L 11/1862; B60L 11/187; B60L 11/1879; B60L 11/1877; H02J 7/0063; H02J 7/0045; H02J 7/0013; H02J 7/02; H02J 7/00
USPC .......... 701/22, 103, 16, 14, 50, 58; 320/107, 320/110, 104, 108, 101, 112
See application file for complete search history.

(56) References Cited

U.S. PATENT DOCUMENTS

| | | | | |
|---|---|---|---|---|
| 5,710,507 | A * | 1/1998 | Rosenbluth | H02J 7/0091 219/209 |
| 5,712,795 | A * | 1/1998 | Layman | A61M 5/142 307/64 |
| 5,767,659 | A * | 6/1998 | Farley | H01M 10/46 320/106 |
| 6,078,163 | A * | 6/2000 | Horie | H01M 10/625 320/104 |
| 6,307,349 | B1 * | 10/2001 | Koenck | H01M 10/4257 320/112 |
| 6,624,615 | B1 * | 9/2003 | Park | B60L 3/0046 320/150 |
| 6,904,342 | B2 * | 6/2005 | Hanada | B60L 11/005 290/36 R |
| 7,525,287 | B2 * | 4/2009 | Miyashita | H01M 2/1072 123/179.1 |
| 7,622,897 | B2 * | 11/2009 | Eberhard | H02J 7/045 320/104 |
| 8,738,210 | B2 * | 5/2014 | Sato | H01M 10/486 701/22 |
| 8,907,629 | B2 * | 12/2014 | Kelty | B60L 11/187 320/132 |
| 2001/0000212 | A1 * | 4/2001 | Reipur | G01R 31/3613 320/104 |
| 2002/0101218 | A1 * | 8/2002 | Koenck | G01R 31/3655 320/140 |
| 2002/0149346 | A1 * | 10/2002 | Sakakibara | H02J 7/0031 320/162 |
| 2002/0175658 | A1 * | 11/2002 | Watts | H02J 7/0091 320/150 |
| 2003/0139859 | A1 * | 7/2003 | Hanada | B60L 11/005 701/22 |
| 2004/0075417 | A1 * | 4/2004 | Aradachi | H02J 7/022 320/107 |
| 2005/0225289 | A1 * | 10/2005 | Iida | H01M 10/441 320/116 |
| 2006/0016793 | A1 * | 1/2006 | Zhu | B60L 11/187 219/205 |
| 2006/0261783 | A1 * | 11/2006 | Gamboa | H01M 10/425 320/138 |
| 2007/0145954 | A1 * | 6/2007 | Kawahara | B60L 11/1864 320/150 |
| 2007/0233334 | A1 * | 10/2007 | Kozarekar | B60K 6/445 701/22 |
| 2009/0140698 | A1 * | 6/2009 | Eberhard | H02J 7/045 320/152 |
| 2009/0295590 | A1 | 12/2009 | Black et al. | |
| 2010/0087976 | A1 * | 4/2010 | Aridome | B60K 6/365 701/22 |
| 2010/0106351 | A1 * | 4/2010 | Hanssen | B60K 6/48 701/22 |
| 2010/0185405 | A1 * | 7/2010 | Aoshima | B60L 3/0046 702/63 |
| 2010/0204861 | A1 * | 8/2010 | Kaita | B60L 11/1851 701/22 |
| 2010/0324765 | A1 * | 12/2010 | Iida | H01M 10/443 701/22 |
| 2010/0328081 | A1 | 12/2010 | Hu et al. | |
| 2011/0127945 | A1 * | 6/2011 | Yon Eda | H01M 2/34 320/101 |
| 2011/0140668 | A1 * | 6/2011 | Anderson | H01M 10/44 320/134 |
| 2011/0288708 | A1 * | 11/2011 | Katono | B60K 1/04 701/22 |
| 2012/0212183 | A1 * | 8/2012 | Yamada | H02J 3/32 320/126 |
| 2013/0103240 | A1 * | 4/2013 | Sato | H01M 10/486 701/22 |
| 2013/0175964 | A1 * | 7/2013 | Watanabe | F04B 49/103 318/472 |
| 2013/0221916 | A1 * | 8/2013 | Kelty | B60L 11/187 320/109 |

(56) References Cited

U.S. PATENT DOCUMENTS

| | | | | |
|---|---|---|---|---|
| 2014/0009117 | A1* | 1/2014 | Ishii | H02J 7/34 320/126 |
| 2014/0217956 | A1* | 8/2014 | Kinonnura | B60L 11/1861 320/101 |
| 2014/0308545 | A1* | 10/2014 | Tamakoshi | H01M 10/3909 429/50 |
| 2015/0054466 | A1* | 2/2015 | Kinonnura | B60L 11/1816 320/134 |
| 2015/0054467 | A1* | 2/2015 | Takano | H01M 10/48 320/136 |
| 2016/0144731 | A1* | 5/2016 | Park | B60L 11/1809 320/109 |
| 2016/0336572 | A1* | 11/2016 | Yoshida | B60L 11/1877 |

FOREIGN PATENT DOCUMENTS

| | | | | |
|---|---|---|---|---|
| JP | 2010-148283 | * | 1/2010 | H02J 7/00 |
| WO | WO 98/54811 A1 | | 12/1998 | |

OTHER PUBLICATIONS

Notice of Allowance for EP Patent Application No. 13785661.3, dated Oct. 11, 2017, 70 pages.

\* cited by examiner

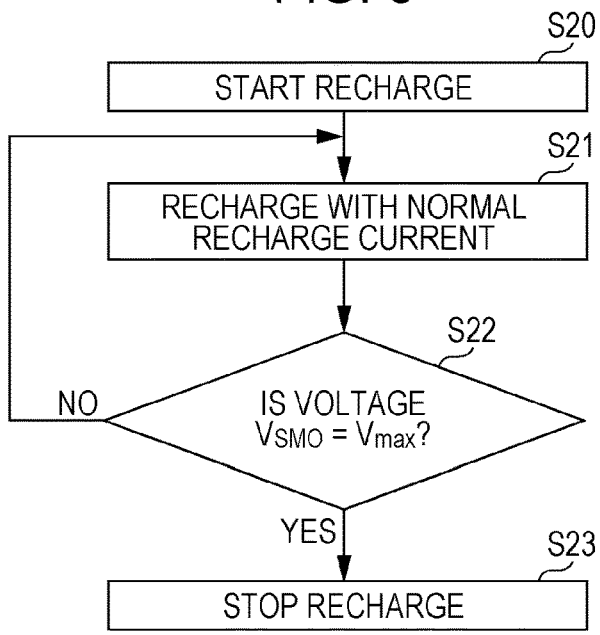
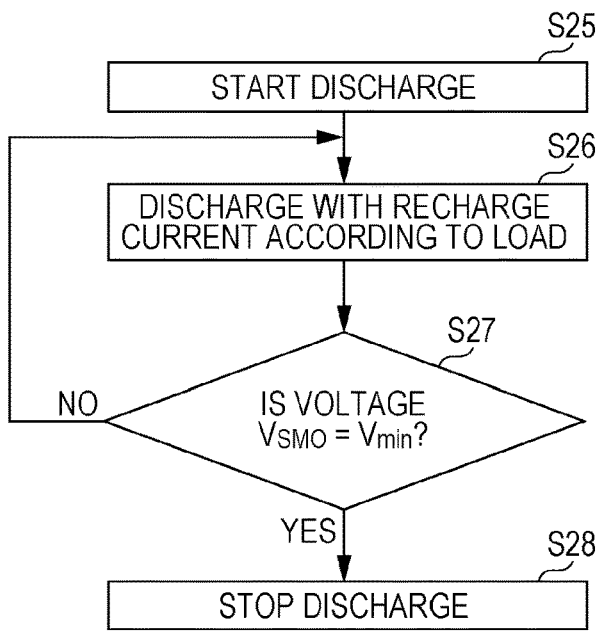

BATTERY CONTROL DEVICE, CONTROL METHOD, CONTROL SYSTEM AND ELECTRIC VEHICLE

CROSS REFERENCE TO RELATED APPLICATIONS

This application is a national stage application under 35 U.S.C. 371 and claims the benefit of PCT Application No. PCT/JP2013/005951 having an international filing date of Oct. 7, 2013, which designated the United States, which PCT application claimed the benefit of Japanese Patent Application No. 2012-263428 filed Nov. 30, 2012, the disclosures of each of which are incorporated herein by reference.

TECHNICAL FIELD

The present disclosure relates to a control device, a control method, a control system and an electric vehicle.

BACKGROUND ART

Secondary batteries are used as a backup power supply or an automobile power supply in addition to various electronic devices. When a secondary battery is used in low temperatures (for example, 0 degrees Celsius or lower), there is a possibility of the performance thereof deteriorating.

CITATION LIST

Patent Literature

[PTL 1]
Japanese Unexamined Patent Application Publication No. 2009-142069
[PTL 2]
Japanese Unexamined Patent Application Publication No. 2006-210244

SUMMARY

Technical Problem

In PTL 1 and PTL 2, a technology is disclosed preventing deterioration in the performance of a secondary battery accompanying usage in low temperatures in advance by using the secondary battery after warming. However, the technology disclosed in PTL 1 and PTL 2 prevents deterioration in the performance of a secondary battery accompanying usage in low temperatures in advance (e.g., prior to when the battery has deteriorated). In a case where the performance of the secondary battery is deteriorated, there is a problem where it is difficult for the performance of the secondary battery to be recovered without, for example, replacement of the secondary battery.

Accordingly, in various embodiments, it is desirable to provide devices (e.g., control devices), methods (e.g., control methods), systems (e.g., control systems), and electric vehicles that recover the performance of a secondary battery (e.g., improve deterioration of the secondary battery).

Solution to Problem

Various embodiments of the present disclosure relate to battery packages including: a power storage portion; and a control device, where the control device determines if a first temperature of the power storage portion is higher than a predetermined temperature, and if the first temperature is higher than the predetermined temperature, discharges the power storage portion at a first discharge rate. In some embodiments, the battery may be adapted for use with an electronic device, where the battery includes the battery package. The electronic device may be a vehicle, and a vehicle can include the battery packages disclosed herein.

Some embodiments of the present disclosure further relate to battery packages adapted for use with a power storage device, including: a power storage portion; and a control device, where the control device functions to determine if a first temperature of a power storage portion is higher than a predetermined temperature, and if the first temperature is higher than the predetermined temperature, discharge the power storage portion at a predetermined first discharge rate.

Further embodiments are directed towards methods of controlling power storage in a battery package, including: determining if a first temperature of the power storage portion is higher than a predetermined temperature, and if the first temperature is higher than the predetermined temperature, discharging the power storage portion at a predetermined first discharge rate.

Advantageous Effects of Invention

According to at least one embodiment, it is possible to improve or recover the performance of a secondary battery.

BRIEF DESCRIPTION OF DRAWINGS

FIG. 3 is a flowchart showing one example of a process in a first recharging mode according to certain embodiments;

FIG. 4 is a flowchart showing one example of a process in a discharge mode according to certain embodiments;

DESCRIPTION OF EMBODIMENTS

Figure 1:
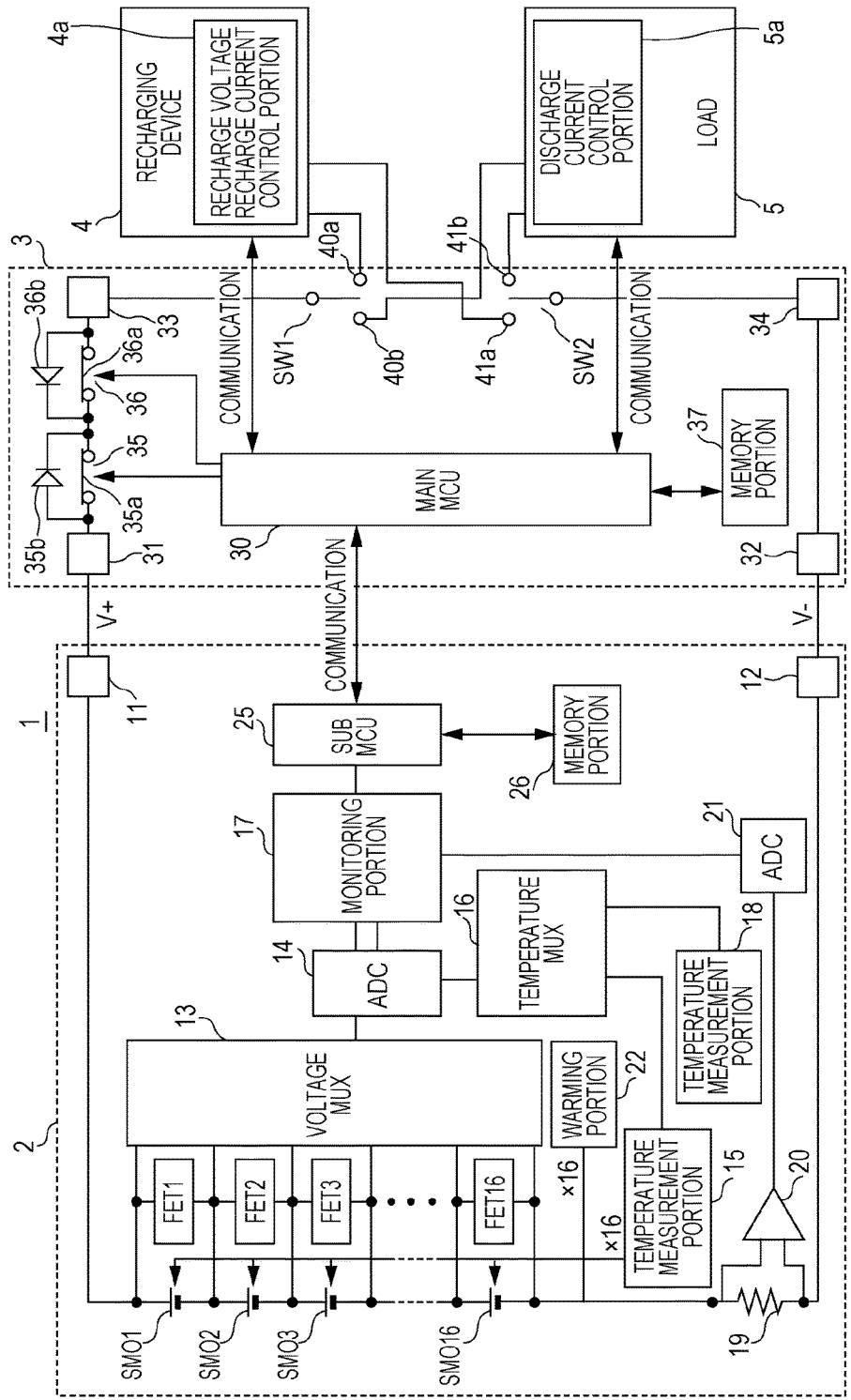
FIG. 1 is a block diagram showing one example of a configuration of a control system according to certain embodiments.

Below, various embodiments of the present disclosure are described with reference to the drawings. Further, the description is given in the following order.
First Embodiment
Modification Examples
Application Examples The various embodiments described below are examples of the present disclosure; however, the content of the present disclosure is not limited to these illustrative embodiments.
[First Embodiment]
Example of Secondary Battery In the present disclosure, illustrative examples of secondary batteries include lithium ion secondary batteries including a cathode active material and a carbon material, such as graphite, as an anode active material. The cathode material is not limited, and a material containing a cathode active material having an olivine structure may be used.

Cathode active materials having an olivine structure may be used, including a lithium iron phosphate compound ($LiFePO_4$) or a mixed lithium iron phosphate compound containing a heteroatom (e.g., $LiFe_xM_{1-x}PO_4$; where M is one or more types of metal, and x is 0<x<1). Here, the term "main constituent" means the content thereof is 50% or higher with respect to the total mass of the cathode active material in the cathode active material layer. In addition, in a case where M is two or more types, each is selected such that the sum total of the subscript numbers is 1-x.

Examples of M include transition elements, group IIA elements, group IIIA elements, group IIIB elements or group IVB elements. For example, at least one type from cobalt (Co), nickel, manganese (Mn), iron, aluminum, vanadium (V), and titanium (Ti) may be included.

The cathode active material may be provided with a coating layer including a metal oxide compound (for example, one formed from Ni, Mn, and Li, among others) with a composition different from the oxide compound, or a phosphate compound (for example, lithium phosphate) on the surface of a lithium iron phosphate compound or a mixed lithium iron phosphate compound.

Cathode materials capable of intaking and releasing lithium (Li), mixed oxides of lithium, such as lithium cobaltate ($LiCoO_2$), lithium nickelate ($LiNiO_2$), and lithium manganate ($LiMnO_2$) having a layered rock-salt structure, and lithium manganate ($LiMn_2O_4$) having a spinel structure, may be used.

Graphites in the present disclosure are not limited, and graphite materials used in industry may be used. As an anode material, lithium titanate, silicon (Si) based materials, and tin (Sn) based materials, among others, may be used.

Manufacturing methods of the electrodes of the batteries according to the present disclosure are not limited, and methods used in industry may be used.

Battery configurations in the present disclosure are not limited and existing configurations may be used.

Electrolytes used in the present disclosure are not limited, and electrolytes used in industry, including liquid, and gel-like electrolytes, among others, may be widely used.

The electrolyte solvent may be 4-fluoro-1,3-dioxolan-2-one (FEC), ethylene carbonate, propylene carbonate, butylene carbonate, vinylene carbonate (VC), dimethyl carbonate, diethyl carbonate, methyl ethyl carbonate, gamma-butyrolactone, gamma-valerolactone, 1,2-dimethoxyethane, tetrahydrofuran, 2-methyl tetrahydrofuran, 1,3-dioxolane, 4-methyl-1,3-dioxolane, methyl acetate, methyl propionate, ethyl propionate, acetonitrile, glutaronitrile, adiponitrile, methoxy acetonitrile, 3-methoxy propironitrile, N,N-dimethyl formamide, N-methyl pyrrolidinone, N-methyl-oxazolidinone, nitromethane, nitroethane, sulfolane, dimethyl sulfoxide, trimethyl phosphate, triethyl phosphate, ethylene sulfide, or bistrifluoromethylsulfonylimide trimethylhexyl ammonium, and may be 4-fluoro-1,3-dioxolan-2-one (FEC), ethylene carbonate, propylene carbonate, butylene carbonate, vinylene carbonate (VC), dimethyl carbonate, diethyl carbonate, methyl ethyl carbonate, gamma-butyrolactone, or gamma-valerolactone in various embodiments.

The electrolyte support salt may be lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), or tris(trifluoromethanesulfonyl)methyllithium ($LiC(SO_2CF_3)_3$ in various embodiments.

Lithium ion secondary batteries may be classified according to shape (e.g., square, cylindrical, or other shapes). In the embodiments and modification examples in the present disclosure, a cylindrical lithium ion secondary battery is used as one illustrative example. One cylindrical lithium ion secondary battery is appropriately referred to as a cell. The average output voltage of a cell of a lithium ion secondary battery may be, for example, approximately 3.0 V (volts), and the full recharge voltage may be, for example, approximately 4.2 V. In addition, the capacity of a cell of a lithium ion secondary battery may be, for example, 3 Ah (ampere-hours), e.g., 3000 mAh (milliampere-hours).

Submodules may be formed by a plurality of cells being connected. A submodule has a configuration in which, for example, 8 cells are connected in parallel. The capacity of a submodule in this case becomes approximately 24 Ah, and the voltage becomes substantially similar to the voltage of the cell at approximately 3.0 V.

Electrical power storage blocks may be formed by a plurality of submodules being connected. The electrical power storage block has a configuration in which, for example, 16 submodules are connected in series. The capacity in this case becomes approximately 24 Ah, and the voltage becomes approximately 48 V (e.g., 3.0 V×16).

A plurality of electrical power storage blocks may be further connected. By connecting a plurality of electrical power storage blocks, it is possible to respond to demands for high capacity and high output. Moreover, the number of cells configuring the submodule and mode of connection of the cells may be appropriately changed. Furthermore, the number of submodules configuring the electrical power storage block and the mode of connection of the submodules may be appropriately changed.

As one illustrative example in the present disclosure, the power storage module may be configured by one power storage block and, e.g., a peripheral circuit. In some embodiments, each of the submodules configuring the power storage block corresponds to a power storage portion. Discharging and recharging may be performed in units of power storage blocks. Measurement of the temperature may be performed in submodule units.

The recharge rate and discharge rate can be determined based on the capacity of the cells of the lithium ion secondary battery, or the capacity of the submodule. Recharging (discharging) with the recharge rate (discharge rate) "1C" means recharging (discharging) with a recharge current (discharge current) (that is, 3000 mA) at which recharging (discharging) completes in one hour, in a case where the capacity of the lithium ion secondary battery is 3000 mAh. For example, recharging (discharging) with a recharge rate (discharge rate) (that is, 300 mA) "0.1C" means recharging (discharging) with a recharge current (discharge current) at which recharging (discharging) completes in 10 hours, in a case where the capacity of the lithium ion secondary battery is 3000 mAh.

In an illustrative case where the submodule is configured by connecting 8 cells in parallel, the recharge current (discharge current) flowing in the power supply line connected to the submodule has a magnitude of 8 times (2400 mA) the recharge current (discharge current) of the cells, and this current is detected by the current detection resistance. The recharge rate (discharge rate) in this case is 0.1C in view of the capacity (24 Ah) of the submodule.

Moreover, the configuration of the power storage portion may be appropriately changed according to the configuration, the scale, and the application, among others, of the system. For example, the power storage block or cell may be configured as the power storage portion. Furthermore, discharging and recharging may be performed in submodule units or cell units. Further, measurement of the temperature may be performed in power storage block or cell units. Furthermore, each determination process described below may be performed with respect to voltage or temperature of each submodule.

[Characteristics of Lithium Ion Secondary Battery]

Recharging in low temperatures (for example, 0 degrees Celsius or lower) with respect to a lithium ion secondary battery is ordinarily prohibited. This is based on the following reason, for example. When recharging is performed with respect to a lithium ion secondary battery at a low temperature, the lithium ions exiting the cathode are not easily absorbed by the anode, and the electrode resistance increases by the metallic lithium precipitated on the surface of the anode. Further absorption of the lithium ions is hampered by the layer of precipitated metallic lithium being deposited. The efficiency of recharging and discharging is lowered due to the reaction with the electrode being hampered, and the performance of the lithium ion secondary battery (e.g., its capacity or cycle service life) deteriorates. Once the performance of the lithium ion secondary battery is deteriorated, repair or replacement should be performed. Therefore, recharging in low temperatures (for example, 0 degrees Celsius or lower) may typically be discouraged or prohibited because it results in deterioration of the secondary battery.

On the other hand, in a secondary battery, such as a lead storage battery or nickel-metal hydride (NiMH) storage battery, for example, recharging and discharging in a range of −20 degrees Celsius to approximately 60 degrees Celsius is not restricted, and may be superior with respect to a lithium ion secondary battery. However, because the range of applications for lithium ion secondary batteries has expanded from electronic devices to backup power supplies or hybrid cars, or others, it may be desirable that the lithium ion secondary batteries be usable (e.g., deterioration is improved) even in constant low temperatures (for example, a range from −10 degrees Celsius to 0 degrees Celsius).

Furthermore, it is desirable to be able to use the lithium ion secondary battery at constant low temperatures and to recover the performance of the lithium ion secondary battery in a case where deterioration of the performance of the lithium ion secondary battery due to use in low temperatures is detected. Moreover, the performance of the lithium ion secondary battery being recovered means, for example, the performance of a deteriorated lithium ion secondary battery being improved.

[Configuration of Control System]

FIG. 1 shows illustrative examples of various embodiments of a configuration of a control system. The control system 1 has a configuration including, for example, a power storage module 2 and a controller 3. Transfer of power and communication is possible between the power storage module 2 and the controller 3. In FIG. 1, only 1 power storage module is illustrated; however, a plurality of power storage modules may be connected, and each power storage module may be connected to a controller. In the case of such a configuration, for example, the cathode terminal and anode terminal of the power storage module at the lowermost position are connected to the controller 3. The power or control command is transmitted from an upper power storage module via a lower power storage module, or conversely, from a lower power storage module via an upper power storage module.

The controller 3 is connected with respect to a recharging device (e.g., recharging power supply) 4 or a load 5 via a power cable and a communication bus. When recharging the power storage module 2, the controller 3 is connected to the recharging device 4. The recharging device 4 has a DC (Direct Current)-DC converter or other converter, and has at least a recharge voltage and recharge current control portion 4a. The recharge voltage and recharge current control portion 4a, for example, sets the recharge voltage and recharge current to a predetermined value according to the control of the controller 3 (main microcontrol unit 30).

When discharging the power storage module 2, the controller 3 is connected to a load 5. Power of the power storage module 2 is supplied with respect to the load 5 via the controller 3. The load 5 connected to the controller 3 is an inverter circuit of a motor system in an electric automobile, a domestic power system or other system.

The load 5 has at least a discharge current control portion 5a. The discharge current control portion 5a sets the discharge current to a predetermined value according to, for example, the control of the main microcontrol unit 30 of the controller 3. For example, the load 5 appropriately controls the magnitude of the discharge current (load current) flowing in the power storage module 2 by varying the load resistance.

[Configuration of Power Storage Module]

Various illustrative examples of configurations of the power storage module 2 will be described. Each portion configuring the power storage module 2 is accommodated in, for example, an outer case with a predetermined shape. It is desirable that the outer case use a material having improved or high conductivity and emissivity. For example, improved heat dissipation may be obtained in the outer case by using a material having high conductivity and emissivity. Increases in the temperature inside the outer case may be suppressed by obtaining improved heat dissipation. Furthermore, the opening portion of the outer case may be minimized or disposed of, and it is possible to realize high dustproofing and drip-proofing. The outer case uses, for example, aluminum or an aluminum alloy, copper, or a copper alloy, among others.

The power storage module 2 has a configuration including, for example, a cathode terminal 11, an anode terminal 12, a power storage block, an FET (Field Effect Transistor), a voltage multiplexer 13, an ADC (Analog to Digital Converter) 14, a temperature measurement portion 15, a temperature multiplexer 16, a monitoring portion 17, a temperature measurement portion 18, a current detection resistance 19, a current detection amplifier 20, an ADC 21, a warming portion 22, a sub-microcontrol unit 25 and a memory portion 26. With respect to the power storage module 2, configurations different from the configuration shown in the examples may be added. For example, a regulator generating a voltage for causing operation of each portion of the power storage module 2 from the voltage of the power storage block may be added.

The power storage block is one or a plurality of submodules SMO that are connected. The submodule SMO is, for example, 8 cylindrical lithium ion secondary batteries connected in parallel. As one illustrative example, a power storage block is configured by 16 of submodule SMO1, submodule SMO2, submodule SMO3, submodule SMO4 . . . and submodule SMO16 being connected in series. Moreover, when each of the submodules does not have to be distinguished, they are appropriately referred to as a submodule SMO.

The cathode side of the submodule SMO1 is connected to the cathode terminal 11 of the power storage module 2. The anode side of the submodule SMO16 is connected to the anode terminal 12 of the power storage module 2. The cathode terminal 11 is connected to the cathode terminal of the controller 3. The anode terminal 12 is connected to the anode terminal of the controller 3.

Corresponding to the configuration of the 16 submodules SMO, 16 FETs (FET 1, FET 2, FET 3, FET 4 . . . FET 16) are provided between the terminals of the submodules SMO. The FET is for performing a passive method cell balance control, for example.

An exemplary overview of cell balance control performed by the FETs will be described. For example, it is assumed that the internal impedance of the submodule SMO2 is increased by the deterioration of the submodule SMO2 progressing more than another submodule SMO. In this state, when recharging is performed with respect to the power storage module 2, the submodule SMO2 may not be recharged to a normal voltage due to increases in the internal impedance. Therefore, unevenness occurs in the balance of voltage between submodules SMO.

In order to resolve the unevenness in balance of the voltage between the submodules SMO, the FETs other than FET 2 are turned on, and submodules SMO other than the submodule SMO2 are discharged to a predetermined voltage value. After discharging, the FETs are turned off. After discharging, the voltage of each submodule SMO becomes, for example, a predetermined voltage (for example, 3.0 V), and balance or improvements in balance between the submodules SMO is established. Moreover, the methods of cell balance control are not limited to the passive method, and a so-called active method or other existing methods may be applied.

The voltage between the terminals of the submodules SMO is detected by a voltage detection portion (not shown in the drawings). The voltage between the terminals of the submodules SMO is detected regardless of whether recharging or discharging is being performed. During discharging of the power storage module 2, the voltage of each submodule SMO is detected by a voltage detection portion with a period of, for example, 250 ms (milliseconds).

The voltage (analog voltage data) of each submodule SMO detected by the voltage detection portion is provided to the voltage multiplexer (MUX (Multiplexer)) 13. In this example, since the power storage block is configured by 16 submodules SMO, 16 items of analog voltage data are supplied to the voltage multiplexer 13.

The voltage multiplexer 13, for example, switches channels with a predetermined period, and selects one item of analog voltage data from the 16 items of analog voltage data. The one item of analog voltage data selected by the voltage multiplexer 13 is supplied to the ADC 14. The voltage multiplexer 13 switches channels and supplies another, for example the next, item of analog voltage data to the ADC 14. That is, 16 items of analog voltage data are supplied from the voltage multiplexer 13 to the ADC 14 with a predetermined period.

Moreover, switching channels in the voltage multiplexer 13 corresponds to control by the sub-microcontrol unit 25 of the power storage module 2 or the main microcontrol unit 30 of the controller 3.

The temperature measurement portion 15 detects the temperature of each submodule SMO. The temperature measurement portion 15 is formed of an element detecting the temperature of a thermistor or other device. The temperature of the submodule SMO is detected with a predetermined period, regardless of whether recharging or discharging is being performed. Because the temperature of the submodule SMO and the temperature of the cells configuring the submodule SMO do not significantly differ, in the embodiment, the temperature of the submodule SMO is measured. The temperatures of each of the 8 cells may be measured, or an average value of the temperatures of the 8 cells may be taken as the temperature of the submodule SMO.

The analog temperature data showing the temperature of each submodule SMO detected by the temperature measurement portion 15 is provided to the temperature multiplexer (MUX) 16. In this illustrative example, because the power storage block is configured by 16 submodules SMO, 16 items of analog voltage data are supplied to the temperature multiplexer 16.

The temperature multiplexer 16, for example, switches channels with a predetermined period, and selects one item of analog temperature data from the 16 items of analog temperature data. The one item of analog temperature data selected by the temperature multiplexer 16 is supplied to the ADC 14. The temperature multiplexer 16 switches channels and supplies another item, for example the next item, of analog temperature data to the ADC 14. That is, 16 items of analog temperature data are supplied from the temperature multiplexer 16 to the ADC 14 with a predetermined period.

Moreover, switching channels in the temperature multiplexer 16 corresponds to control by the sub-microcontrol unit 25 of the power storage module 2 or the main microcontrol unit 30 of the controller 3.

The ADC 14 converts the analog voltage data supplied from the voltage multiplexer 13 to digital voltage data. The ADC 14 converts the analog voltage data to, for example, 14 to 18 bit digital voltage data. In the conversion method in the ADC 14, various methods are applicable, such as a sequential comparison method or a delta-sigma (Delta Sigma) method.

The ADC 14 is provided with, for example, an input terminal, an output terminal a control signal input terminal to which a control signal is input, and a clock pulse input terminal to which a clock pulse is input (however, these terminals are not shown in the drawings). Analog voltage data is input to the input terminal. Digital voltage data is output from the output terminal after conversion.

A control signal (e.g., control command) supplied from the controller 3, for example, is input to the control signal input terminal. The control signal is an acquisition instruction signal instructing the acquisition of analog voltage data supplied from the voltage multiplexer 13. When the acquisition instruction signal is input, the analog voltage data is acquired by the ADC 14, and the acquired analog voltage data is converted to digital voltage data. The digital voltage data is output via the output terminal according to a synchronization clock pulse input to the clock pulse input terminal. The output digital voltage data is supplied to the monitoring portion 17.

Furthermore, the acquisition instruction signal instructing the acquisition of analog temperature data supplied from the temperature multiplexer 16 is input to the control signal input terminal. The ADC 14 acquires the analog temperature data according to the acquisition instruction signal. The acquired analog temperature data is converted to digital temperature data by the ADC 14. The analog temperature data is converted to, for example, 14 to 18 bit digital temperature data. The converted digital temperature data is output via the output terminal, and the output digital temperature data is supplied to the monitoring portion 17. Moreover, the configuration may have the ADCs processing the respective voltage data and temperature data separately provided. A functional block of the ADC 14 may have a comparator function comparing the voltage or temperature to a predetermined value.

The 16 items of digital voltage data or 16 items of digital temperature data are transmitted from the ADC 14 with respect to the monitoring portion 17 by being time-division multiplexed. An identifier identifying the submodule SMO is written to the header of the transmitted data, and may indicate which submodule SMO the voltage or temperature is from. Moreover, in this example, the digital voltage data of each submodule SMO obtained with a predetermined period and converted to digital data by the ADC 14 corresponds to voltage information. The analog voltage data may be set as voltage information, or the digital voltage data created in a correction process may be set as the voltage information.

The temperature measurement portion 18 measures the temperature of the overall power storage module 2. The temperature inside the outer case of the power storage module 2 is measured by the temperature measurement portion 18. The analog temperature data measured by the temperature measurement portion 18 is supplied to the temperature multiplexer 16, and supplied from the temperature multiplexer 16 to the ADC 14. The analog temperature data is converted to digital temperature data by the ADC 14. The digital temperature data is supplied to the monitoring portion 17 from the ADC 14.

The power storage module 2 has a current detection portion detecting the value of a current (load current) flowing in the current path of the power storage module 2. The current detection portion detects the current value flowing in the 16 submodules SMO. The current detection portion is configured with a current detection resistance 19 connected between the anode side and the anode terminal 12 of the submodule SMO 16, and a current detection amplifier 20 connected to both ends of the current detection resistance 19. The analog current data is detected by the current detection resistance 19. The analog current data is detected with a predetermined period, for example, regardless of whether recharging or discharging is being performed.

The detected analog current data is supplied to the current detection amplifier 20. The analog current data is amplified by the current detection amplifier 20. The gain of the current detection amplifier 20 is set to, for example, approximately 50 to 100 times. The amplified analog current data supplied to the ADC 21.

The ADC 21 converts the analog current data supplied from the current detection amplifier 20 to digital current data. The analog current data is converted to, for example, 14 to 18 bit digital current data by the ADC 21. For the conversion method in the ADC 21, various methods are applicable, such as a sequential comparison method or a delta-sigma (e.g., Delta Sigma) method.

The ADC 21 is provided with, for example, an input terminal, an output terminal, a control signal input terminal to which a control signal is input, and a clock pulse input terminal to which a clock pulse is input (these terminals are not shown in the drawings). Analog current data is input to the input terminal. Digital current data is output from the output terminal.

A control signal (e.g., control command) supplied from the controller 3, for example, is input to the control signal input terminal of the ADC 21. The control signal is, for example, an acquisition instruction signal instructing the acquisition of analog current data supplied from the current detection amplifier 20. When the acquisition instruction signal is input, the analog current data is acquired by the ADC 21, and the acquired analog current data is converted to digital current data. The digital current data is output from the output terminal according to a synchronization clock pulse input to the clock pulse input terminal. The output digital current data is supplied to the monitoring portion 17. This digital current data is one example of current information. Moreover, the ADC 14 and ADC 21 may be configured as the same ADC.

The monitoring portion 17 monitors the digital voltage data and digital temperature data supplied from the ADC 14, and monitors for the presence of anomalies of the submodule SMO. For example, in a case where the voltage indicated by the digital voltage data is in the vicinity of 4.2 V, which is an indicator of over-recharging, or in the vicinity of 2.0 V to 2.7 V, which is an indicator of over-discharging, an anomaly notification signal is generated indicating an anomaly is present or there is concern of the occurrence of an anomaly. Furthermore, in a case where the temperature of the submodule SMO or the temperature of the entire power storage module 2 is higher than a threshold, the monitoring portion 17 generates an anomaly notification signal in a similar manner.

Furthermore, the monitoring portion 17 monitors the digital current data supplied from the ADC 21. In a case where the current value indicated by the digital current data is greater than the threshold, the monitoring portion 17 generates an anomaly notification signal. The anomaly notification signal generated by the monitoring portion 17 is transmitted with respect to the sub-microcontrol unit 25 by a communication function, which may be a part of the monitoring portion 17.

The monitoring portion 17 transmits the digital voltage data for each of 16 submodules SMO supplied from the ADC 14 and digital current data supplied from the ADC 21 to the sub-microcontrol unit 25, along with monitoring the presence anomalies described above. The digital voltage data for each submodule SMO and the digital current data may be supplied directly to the sub-microcontrol unit 25 without passing through the monitoring portion 17. The digital voltage data transmitted for each submodule SMO and the digital current data are input to the sub-microcontrol unit 25. Furthermore, the digital temperature data supplied from the ADC 14 is supplied to the sub-microcontrol unit 25 from the monitoring portion 17.

The warming portion 22 warms the submodule SMO. The warming portion 22, for example, is formed of a resistance power line having a predetermined resistance value, and provided in the vicinity of the submodule SMO. In the power storage module 2, resistance power lines are arranged so as to be able to efficiently warm each submodule SMO, and each submodule SMO is heated by flowing a current with respect to the resistance power lines. Control with respect to the warming portion 22 is performed by, for example, the sub-microcontrol unit 25.

The sub-microcontrol unit 25 is configured by a CPU (Central Processing Unit) or other processing device having a communication function, and controls each portion of the power storage module 2. The sub-microcontrol unit 25, for example, when the anomaly notification signal is supplied from the monitoring portion 17, notifies the main microcontrol unit 30 of the controller 3 of an anomaly using the communication function. The main microcontrol unit 30 appropriately executes a process of stopping, for example, recharging or discharging according to the notification. Moreover, in the sub-microcontrol unit and main control unit, the descriptions of "sub" and "main" are for convenience of description, and do not have a special meaning.

Between the sub-microcontrol unit 25 and the main microcontrol unit 30, bi-directional communication based on standards such as I2C, which is a serial communication standard, or SMBus (System Management Bus), SPI (Serial Peripheral Interface), or CAN (Controller Area Network) is performed. Such a communication may be wired or may be wireless.

The digital voltage data is input with respect to the sub-microcontrol unit 25 from the monitoring unit 17. For example, the digital voltage data for each submodule SMO during discharging of the power storage module 2 is input to the sub-microcontrol unit 25.

Furthermore, the magnitude (digital current data) of the load current when a load is connected to the power storage module 2 is input to the sub-microcontrol unit 25 from the monitoring portion 17. The digital temperature data indicating the temperature of each submodule SMO or the temperature in the power storage module 2 is input to the sub-microcontrol unit 25.

The sub-microcontrol unit 25 transmits the digital voltage data input for each submodule SMO or the digital temperature data indicating the temperature for each submodule SMO, or the digital current data, among others, with respect to the main microcontrol unit 30.

The memory portion 26 is configured with a ROM (Read Only Memory), RAM (Random Access Memory) or other memory. A program executed by the sub-microcontrol unit 25, for example, is accommodated in the memory portion 26. The memory portion 26 is further used as a work area when the sub-microcontrol unit 25 executes processes.

In various embodiments, a history of recharging and discharging (which may appropriately be referred to as a recharging and discharging history) is further stored in the memory portion 26. The recharging and discharging history includes recharging conditions, such as the recharging rate or recharging time, and number of recharges, discharging conditions, such as the discharging rate or discharging time, and number of discharges, and information on the temperature of the submodule SMO when recharging or discharging is performed, for example.

The sub-microcontrol unit 25 may perform processes with reference to the recharging and discharging history. For example, the sub-microcontrol unit 25 transmits an alarm signal with respect to the main microcontrol unit 30 in a case where at least one of the number of recharges or the recharging time at 0 degrees Celsius or lower exceeds a threshold. The main microcontrol unit 30 receiving the alarm signal, for example, performs a process prompting the inspection or replacement of the power storage module 2 using sound, display, or other component, with respect to a user. The threshold is set, for example, to a number of 500 recharges and a recharge time of 5000 h, or to 1000 Ah as an integrated recharge capacity value at low temperatures.

[Configuration of Controller]

Next, one example of a configuration of the controller 3 will be described. The controller 3 performs management of, for example, recharging or discharging with respect to one or a plurality of power storage modules 2. In various embodiments, the controller 3 performs starting and stopping of recharging of the power storage module 2, starting and stopping of discharging of the power storage module 2, and setting of the recharge rate and discharge rate, among others. The controller 3 is configured to have an outer case in a similar manner as the power storage module 2.

The controller 3 has a configuration including a main microcontrol unit 30, a cathode terminal 31, an anode terminal 32, a cathode terminal 33, an anode terminal 34, a recharge control portion 35, a discharge control portion 36, a switch SW1 and a switch SW2, in various embodiments. The switch SW1 is connected to a terminal 40a or a terminal 40b. The switch SW2 is connected to a terminal 41a or a terminal 41b.

The cathode terminal 31 is connected to the cathode terminal 11 of the power storage module 2. The anode terminal 32 is connected to the anode terminal 12 of the power storage module 2. The cathode terminal 33 and the anode terminal 34 are connected to a recharging device 4 connected to the controller 3 or are connected to a load 5.

The main microcontrol unit 30 is, for example, configured with a CPU having a communication function, and controls each portion of the controller 3. The main microcontrol unit 30 controls recharging and discharging according to an anomaly notification signal transmitted from the sub-microcontrol unit 25 of the power storage module 2. If, for example, a notification of a concern of over-recharging is performed by the anomaly notification signal, the main microcontrol unit 30 turns off at least a switching element of the recharging control portion 35, and stops the recharging. If, for example, a notification of a concern of over-discharging is performed by the anomaly notification signal, the main microcontrol unit 30 turns off at least a switching element of the discharge control portion 36, and stops the discharging.

If, for example, a notification is performed of the presence of deterioration of the submodule SMO by the alarm signal, the main microcontrol unit 30 turns off the switching elements of the recharge control portion 35 and the discharge control portion 36, and stops the use of the power storage module 2. If, for example, the power storage module 2 is used as a backup power supply, the use of the power storage module 2 is stopped at an appropriate timing without immediately stopping the use of the power storage module 2.

In the present disclosure, the main microcontrol unit 30 functions as one example of a control portion in the claims. The main microcontrol unit 30 monitors the voltage or temperature of the submodule SMO transmitted from the sub-microcontrol unit 25, and performed the processes described herein, in addition to performing management of the recharging and discharging of the power storage module 2. Moreover, the configuration may have a sub-microcontrol unit 25 with one portion of the function of the main microcontrol unit 30 described below.

The main microcontrol unit 30 is able to perform communication with a CPU having a recharging device 4 or load 5. The main microcontrol unit 30 sets the recharge voltage and recharge rate (magnitude of the recharge current) with respect to the power storage 2 module, and transmits the recharge voltage and recharge rate set to the recharging device 4. The recharge voltage and recharge current control portion 4a appropriately sets the recharge voltage and recharge current according to the recharge voltage and recharge rate transmitted from the main microcontrol unit 30.

The main microcontrol unit 30 sets the discharge rate (e.g., magnitude of the discharge current) of discharging of the power storage 2 module, and transmits the discharge rate set to the load 5. The discharge current control portion 5a of the load 5 appropriately sets the load so as to become the discharge current according to the discharge rate transmitted from the main microcontrol unit 30.

The recharge control portion 35 is formed of a recharge control switch 35a and a diode 35b connected in the forward direction with respect to the discharge current in parallel with the recharge control switch 35a. The discharge control portion 36 is formed of a discharge control switch 36a and a diode 36b connected in the forward direction with respect to the recharge current in parallel with the discharge control switch 36a. As the recharge control switch 35a and the discharge control switch 36a, for example, an IGBT (Insulated Gate Bipolar Transistor) or MOSFET (Metal Oxide Semiconductor Field Effect Transistor) may be used. Moreover, the recharge control portion 35 and the discharge control portion 36 may be inserted in a negative power supply line.

The memory portion 37 is configured of a ROM or a RAM or other memory. A program executed by the main microcontrol unit 30, for example, is accommodated in the memory portion 37. The memory portion 37 is used as a work area when the main microcontrol unit 30 executes processes. The memory portion 37 may store a history of recharging and discharging.

The switch SW1 is connected to a positive power supply line connected to the cathode terminal 33. When recharging the power storage module 2, the switch SW1 is connected to the terminal 40a, and when discharging the power storage module 2, the switch SW1 is connected to the terminal 40b.

The switch SW2 is connected to a negative power supply line connected to the anode terminal 34. When recharging the power storage module 2, the switch SW2 is connected to the terminal 41a, and when discharging the power storage module 2, the switch SW2 is connected to the terminal 41b. Switching between the switch SW1 and the switch SW2 is controlled by the main microcontrol unit 30.

[Main Process]

Above, the configuration of the control system 1 in illustrative embodiments was described. Next, illustrative embodiments of the main processes executed in the control system 1 will be described.

Figure 2:
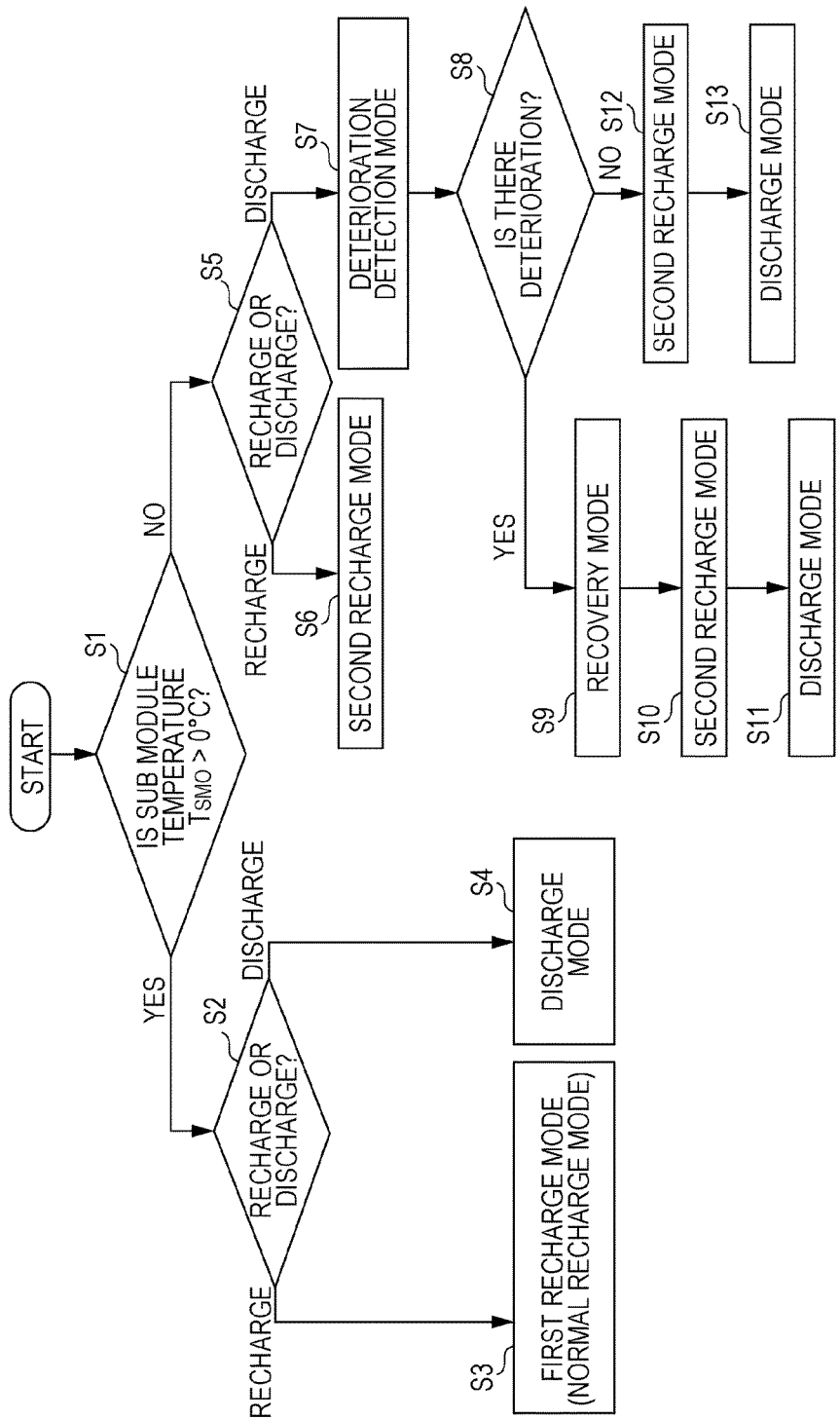
FIG. 2 is a flowchart for describing one example of a main process in a control system according to certain embodiments.

FIG. 2 is an illustrative flowchart for describing embodiments of the main process executed in the control system 1. In Step S1, it is determined whether the temperature $T_{SMO}$ of the submodule SMO is greater than 0 degrees Celsius. The temperature of each submodule SMO measured by the temperature measurement portion 15 is converted to digital temperature data. Sixteen items of digital temperature data are transmitted to the main microcontrol unit 30 from the sub-microcontrol unit 25.

The main microcontrol unit 30 determines whether the temperature $T_{SMO}$ indicated by the lowest digital temperature data item among the 16 items of digital temperature data is greater than 0 degrees Celsius, for example. It may be determined whether all 16 temperatures are greater than 0 degrees Celsius; however, because each submodule SMO is arranged adjacent the others to a certain extent, determining whether only the lowest temperature is greater than 0 degrees Celsius is more efficient. An average of the temperatures of the 16 submodules SMO may be taken as the temperature $T_{SMO}$.

In various embodiments, in a case where the temperature $T_{SMO}$ is greater than 0 degrees Celsius, the process proceeds to Step S2. Moreover, the term "greater" can be interpreted as either of "exceed" (not including the threshold) and "or more" (including the threshold). In addition, the term "lower" can be interpreted as either of "less than" (not including the threshold) and "or less" (including the threshold). The descriptions in other locations are also the same. In addition, the respective interpretations of "high" and "low" are the same.

In Step S2, whether use of the power storage module 2 is recharging or discharging is determined. In a case where recharging is determined in Step S2, the process proceeds to Step S3. In Step S3, a process is performed with the first recharging mode (normal recharging mode). Moreover, the term "mode" means one or a plurality of collected processes. The content of the processes of each mode will be described below.

In a case where discharging is determined in Step S2, the process proceeds to Step S4. In Step S4, processing is performed according to the discharging mode.

In a case where the temperature $T_{SMO}$ in Step S1 is lower than 0 degrees Celsius, the process proceeds to Step S5. In Step S5, it is determined whether the power storage module 2 is used in recharging or discharging. In a case where recharging is determined in Step S5, the process proceeds to Step S6. In Step S6, processing is performed according to the second recharging mode. In a case where discharging is determined in Step S5, the process proceeds to Step S7.

In Step S7, processing is performed according to the deterioration detection mode. In Step S8, it is determined if deterioration is present in the power storage module 2 based on, for example, results of the processing according to the deterioration detection mode. In a case where it is determined in Step S8 that deterioration is present in the power storage module 2, the process proceeds to Step S9.

In Step S9, processing is performed according to the recovery mode. The recovery mode is a mode for causing the performance of a cell configuring the submodule SMO to recover, and causing the performance of the power storage module 2 to recover. The details are described herein; however, in various embodiments of the recovery mode, processes recharging the power storage module 2 as appropriate, and thereafter gradually discharging the power storage module 2 with a low current (for example, 0.1C), are performed.

In Step S10, processing is performed according to the second recharging mode. Because the power storage module 2 is discharged by the processing according to the recovery mode in Step S9, the power storage module 2 is recharged according to the second recharging mode in Step S10. In Step S11, the power storage module 2 is discharged according to the discharge mode. This discharging is a process corresponding to the determination in Step S5.

In a case where it is determined, for example in Step S8, that deterioration is not present in the power storage module 2, the process proceeds to Step S12. In Step S12, processing is performed as appropriate according to the second recharging mode. In processing according to the deterioration detection mode in Step S7, as one example, the voltage (potential) during discharging the power storage module 2 is monitored. Therefore, after processing according to the deterioration detection mode finishes, the voltage of the power storage module 2 is in a lowered state. Thereby, in Step S12, the power storage module 2 is recharged by processing according to the second recharging mode. In Step S13, the power storage module 2 is discharged according to the discharge mode. This discharging is a process corresponding to the determination in Step S5.

[Processing According to First Recharging Mode]

Details of the processes of each mode will be described. FIG. 3 is an illustrative flowchart showing the flow of processing according to embodiments of a first recharging mode. In Step S20, processing according to the first recharging mode is started. In Step S21, the power storage module 2 is recharged with the normal recharge rate (for example, 1C). In various embodiments, the process proceeds to Step S22.

During recharging, the digital voltage data for the 16 submodules SMO is input with a predetermined period to the main microcontrol unit 30 of the controller 3. The main microcontrol unit 30 monitors the digital voltage data, and determines whether the highest voltage $V_{SMO}$ among the 16 items of digital voltage data attains the voltage $V_{max}$. The voltage $V_{max}$ is set to, for example, a voltage (e.g., approximately 4.2 V), which may be close to a substantially full recharge voltage. In a case where the voltage $V_{SMO}$ does not attain the voltage $V_{max}$, the process returns to Step S21 and recharging is continued. In a case where the voltage $V_{SMO}$ attains the voltage $V_{max}$, the process proceeds to Step S23 and recharging is stopped.

[Processing According to Discharge Mode]

FIG. 4 is an illustrative flowchart showing the flow of processing according to embodiments of a discharge mode. In Step S25, processing according to the discharge mode is started. In Step S26, the power storage module 2 is discharged with the load current according to the load. In various embodiments, the process proceeds to Step S27.

During discharging, the digital voltage data for the 16 submodules SMO is input with a predetermined period to the main microcontrol unit 30 of the controller 3. The main microcontrol unit 30 monitors the digital voltage data, and determines whether the lowest voltage $V_{SMO}$ among the 16 items of digital voltage data attains the voltage $V_{min}$. The voltage $V_{min}$ is set to a range of 2.0 V to 2.7 V, which is an indicator of over-discharge. In a case where the voltage $V_{SMO}$ does not attain the voltage $V_{min}$, the process returns to Step S26, and discharging is continued. In a case where the voltage $V_{SMO}$ attains the voltage $V_{min}$, the process proceeds to Step S28, and discharging is stopped.

[Processing According to Second Recharging Mode]

Figure 5:
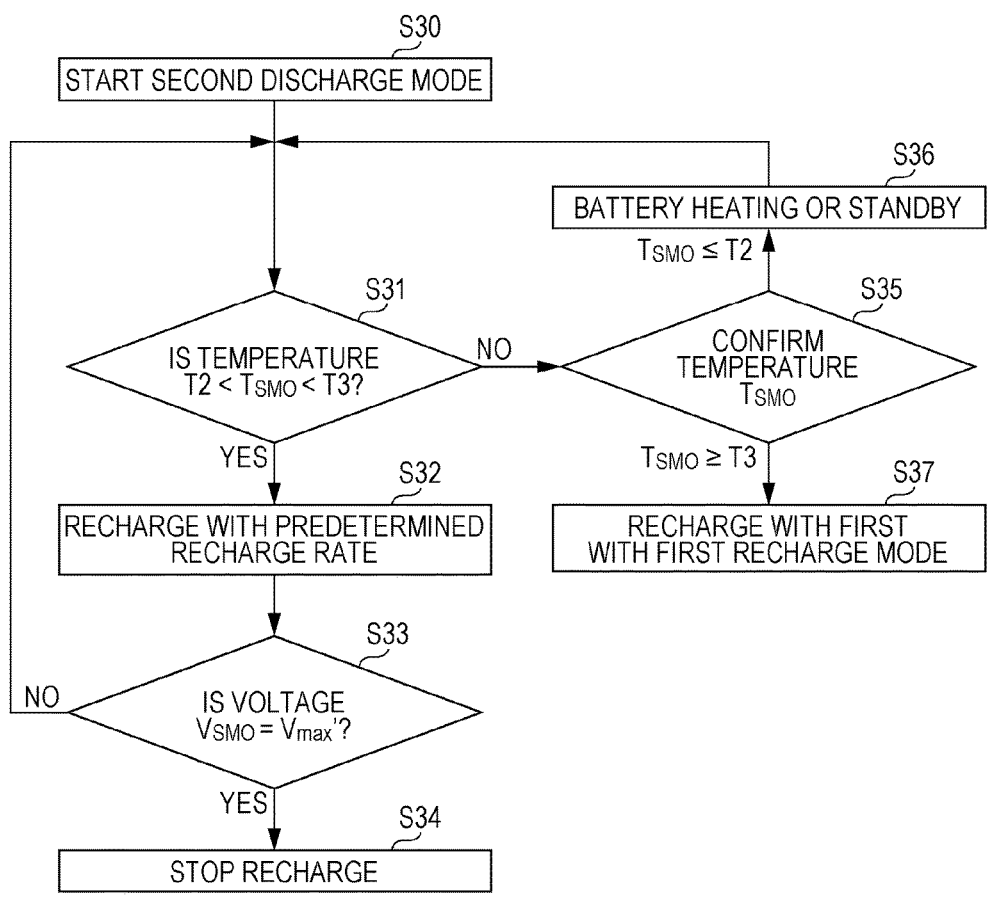
FIG. 5 is a flowchart showing one example of a process in a second recharging mode according to certain embodiments.

FIG. 5 is an illustrative flowchart showing the flow of processing according to embodiments of a second recharging mode. In Step S30, processing according to the second recharging mode is started. In Step S31, it is determined whether the temperature $T_{SMO}$, which is the lowest temperature of the temperatures of the 16 submodules SMO, is in a range greater than a temperature T2 and lower than a temperature T3 (e.g., a predetermined low temperature range). The temperature T2 is set, for example, to −10 degrees Celsius, and the temperature T3 is set, for example, to 0 degrees Celsius. The main microcontrol unit 30 determines whether the temperature $T_{SMO}$ is in the predetermined low temperature range. In a case where the temperature $T_{SMO}$ is in a predetermined low temperature range, the process proceeds to Step S32.

In Step S32, the power storage module 2 is recharged with the recharge rate. The predetermined recharge rate is a recharge rate lower than 0.2C, and may be set between 0.1C to 0.2C. The predetermined recharge rate is instructed with respect to the recharge voltage and recharge current control portion 4a from the main microcontrol unit 30. Recharging is performed with a low current, and the process proceeds to Step S33 in various embodiments.

In Step S33, the main microcontrol unit 30 determines whether the highest voltage $V_{SMO}$ of the voltages $V_{SMO}$ of the 16 submodules SMO attains the voltage $V_{max}'$. The voltage $V_{max}'$ is set to a value lower than the voltage $V_{max}$ in the first recharging mode. The voltage $V_{max}'$ is set to, for example, approximately 3.5 V.

In a case where the voltage $V_{SMO}$ does not attain the voltage $V_{max}'$, the process returns to Step S31 and recharging is continued. The determination of Step S33 is made with respect to the voltage $V_{SMO}$ of the 16 submodules SMO input at a timing, for example the next timing. In a case where the highest voltage $V_{SMO}$ attains the voltage $V_{max}'$, the process proceeds to Step S34 and recharging is stopped.

Recharging is performed with a low current in Step S32, and it is possible to reduce or prevent precipitation of metallic lithium on the surface of the anode due to recharging in low temperatures by not recharging up to the full recharge voltage in Step S33. In so doing, recharging may be performed with respect to a lithium ion secondary battery at predetermined low temperatures lower than 0 degrees Celsius.

In a case where temperature $T_{SMO}$ is not in a predetermined low temperature range in Step S31, the process proceeds to Step S35. In Step S35, it is determined whether the temperature $T_{SMO}$ is lower than −10 degrees Celsius (for example, −10 degrees Celsius or lower) or the temperature $T_{SMO}$ is higher than 0 degrees Celsius (for example, 0 degrees Celsius or higher). Moreover, because there are cases where the temperature $T_{SMO}$ increase due to the process performed before the process of the second recharging mode, in Step S35 it is determined whether the temperature $T_{SMO}$ is 0 degrees Celsius or higher. In a case where the temperature $T_{SMO}$ is −10 degrees Celsius or lower, the process proceeds to Step S36.

In Step S36, a process is performed causing the temperature of each submodule SMO to be raised. The main microcontrol unit 30 instructs warming by the warming portion 22 with respect to the sub-microcontrol unit 25. The sub-microcontrol unit 25 warms each submodule SMO by a current flowing in the resistance power lines, which are one illustrative example of a warming portion 22 according to the instruction from main microcontrol unit 30. After warming is performed by the warming portion 22 for a predetermined time, warming is temporarily stopped in a standby state. The process returns to Step S31, and determination according to step s31 is performed. Moreover, while warming by the warming portion 22 is performed, the determination according to Step S31 may be periodically performed.

In Step S35, if the temperature $T_{SMO}$ is 0 degrees Celsius or higher, the process proceeds to Step S37. If the temperature $T_{SMO}$ is 0 degrees Celsius or higher, recharging is performed according to the first recharging mode, which is a normal recharging mode, for example. Because the process according to the first recharging mode was previously described, overlapping description will not be made.

As described above, in second recharging mode, if the temperature of the submodule SMO is within a predetermined low temperature range, recharging is performed with a low current, and the voltage stopping recharging is made lower than the full recharge voltage. If the temperature of the submodule SMO is still lower than a predetermined low temperature range, the submodule SMO is warmed. Moreover, it is possible to set the temperature T2 sill lower. For example, the temperature T2 may be set to −20 degrees Celsius.

[Processing According to Deterioration Detection Mode]

Next, processing according to various embodiments of the deterioration detection mode will be described. Prior to the description of the processing according to the deterioration detection mode, changes in the voltage of the lithium ion secondary battery when a cell of the lithium ion secondary battery is deteriorated due to recharging at low temperatures will be described. Moreover, in this illustrative example, because the submodule SMO is configured by lithium ion secondary batteries being connected in parallel, the output voltage of the lithium ion secondary battery and the output voltage of the submodule SMO have substantially similar values.

Figure 6:
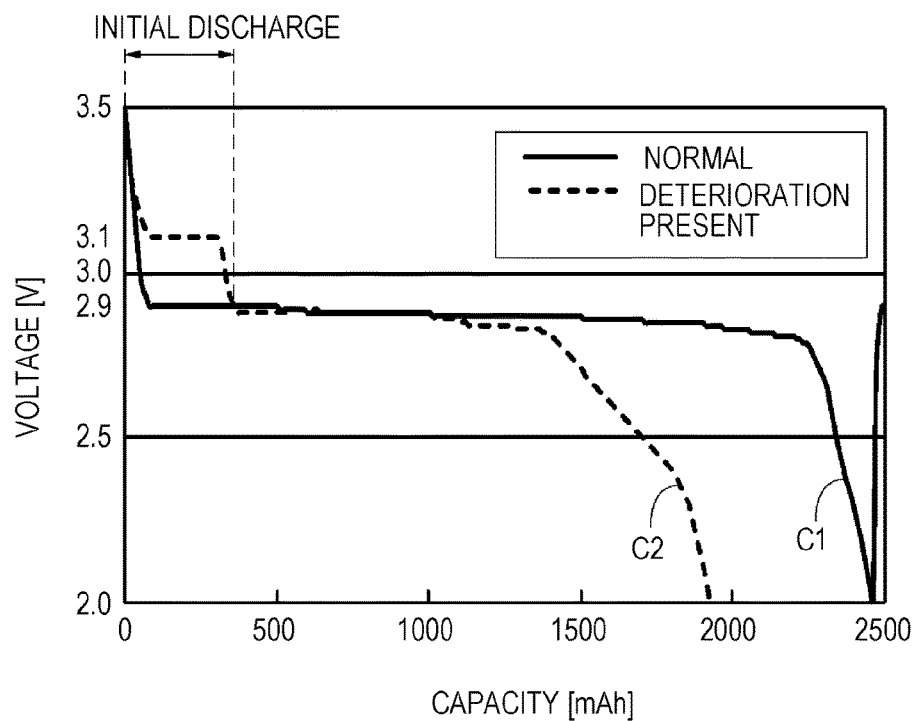
FIG. 6 is a diagram for describing one example of changes in capacity and changes in voltage during discharging according to certain embodiments.

FIG. 6 shows an illustrative example of embodiments of the discharge curve of the cell of a lithium ion secondary battery. The vertical axis shows the voltage of a cell, and the horizontal axis shows the capacity of the cell. Moreover, the discharge curve draws a curve differing according to the discharge current. Therefore, the standard voltage described below also differs according to the discharge current.

The solid line curve C1 in FIG. 6 shows the discharge curve of a normal cell. The curve C1, for example, is stored in the memory portion 26. The dotted line curve C2 shows the discharge curve of a cell deteriorated due to metallic lithium precipitated on the surface of the anode of the lithium ion secondary battery. As described above, when recharging at low temperatures (for example, between −10 degrees Celsius to 0 degrees Celsius) is repeated, metallic lithium precipitates on the surface of the anode of the lithium ion secondary battery.

In a case where the cell is normal, the voltage due to connection with the anode is lowered from a voltage before connection with the anode of 3.5 V to the vicinity of 2.9 V. Thereafter, a plateau (flat) location at which approximately 2.9 V is maintained is passed through and the voltage gradually lowers. The voltage (e.g., approximately 2.9 V) corresponding to the plateau location is one illustrative example of the standard voltage. Because the cell is overdischarged when the voltage is a predetermined voltage (for example, 2.0 V) or lower, discharging is stopped, and the module 2 is separated from the load. In the curve C1, locations where the voltage increases from the vicinity of 2.0 V to the vicinity of 3.0 V are voltage increases according to the load being separated.

In a case where the cell is deteriorated, the voltage is lowered by connection to the load in a similar manner as in a normal case. However, the voltage lowers to a voltage greater than the standard voltage (for example, 3.1 V) without lowering to the standard voltage. After the voltage passes through a location of high potential, which is approximately 3.1 V for example, the voltage lowers to the standard voltage (e.g., approximately 2.9 V). Thereafter, a plateau (flat) location at which approximately 2.9 V is maintained is passed through and the voltage gradually lowers. Moreover, when deterioration is present in the cell, the capacity (e.g., discharge capacity) becomes smaller.

In the curve C2, various illustrative reasons are theorized for the presence of locations of a high potential of 3.1 V. For example, when recharging is repeated at low temperatures, metallic lithium precipitates on the surface of the anode of the lithium ion secondary battery, and a state is attained close to a state in which the metallic lithium is used as if an anode. Here, because the metallic lithium shows the lowest potential among the elements, the potential difference between the cathode and the anode becomes larger and it is thought that locations of high potential occur. Because the metallic lithium on the surface of the anode dissolves partially or fully as discharging progresses, the voltage lowers from approximately 3.1 V to approximately 2.9 V, which is the standard voltage.

That is, when the power storage block is discharged, the voltage of the submodule SMO is monitored, and as a result it is possible to detect a deterioration of the lithium ion secondary battery and the submodule SMO used in the lithium ion secondary battery if locations of high potential are detected in the initial discharge.

Moreover, the term "initial discharge" indicates, for example, intervals from the start of discharge until a predetermined period elapses. The predetermined period may be appropriately set. For example, a period of approximately 1 second is set. The initial discharge may be defined by the SOC (State of Charge) of the submodule SMO or the cell. For example, the initial discharge may be defined as a period including a period in which the SOC is greater than 80%.

A period including the period in which the SOC is greater than 80% is set to be a period between from the SOC being approximately 80% to approximately 100%. The minimum is not necessarily 80%, and the maximum is not necessarily 100%, so that the period is between the SOC being from about 85% to about 95%, for example.

Figure 7:
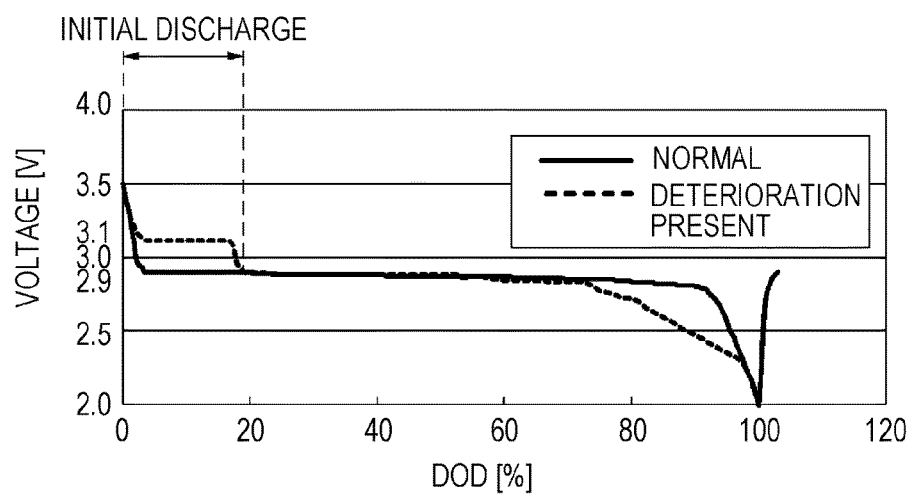
FIG. 7 is a diagram for describing one example of changes in DOD and changes in voltage during discharging according to certain embodiments.

Furthermore, as shown in FIG. 7, in various embodiments, an initial discharge may be defined by the DOD (Depth of Discharge) of the submodule SMO or the cell. For example, the initial discharge may be defined as a period including a period in which the DOD is less than about 20%.

A period including the period in which the DOD is less than about 20% is set to a period between from the DOD being 0% to about 20%. The minimum is not necessarily 0%, and the maximum is not necessarily 20%, so that the period is between from the DOD being about 5% to about 15%.

Moreover, the meaning of the SOC includes the extent of recharging; that is, the ratio of the capacity recharged with respect to the nominal capacity, which may be shown using a percentage. In addition, the meaning of the DOD includes the depth of discharging; that is, the ratio of the discharge capacity with respect to the rating capacity, which may be shown using a percentage.

Figure 8:
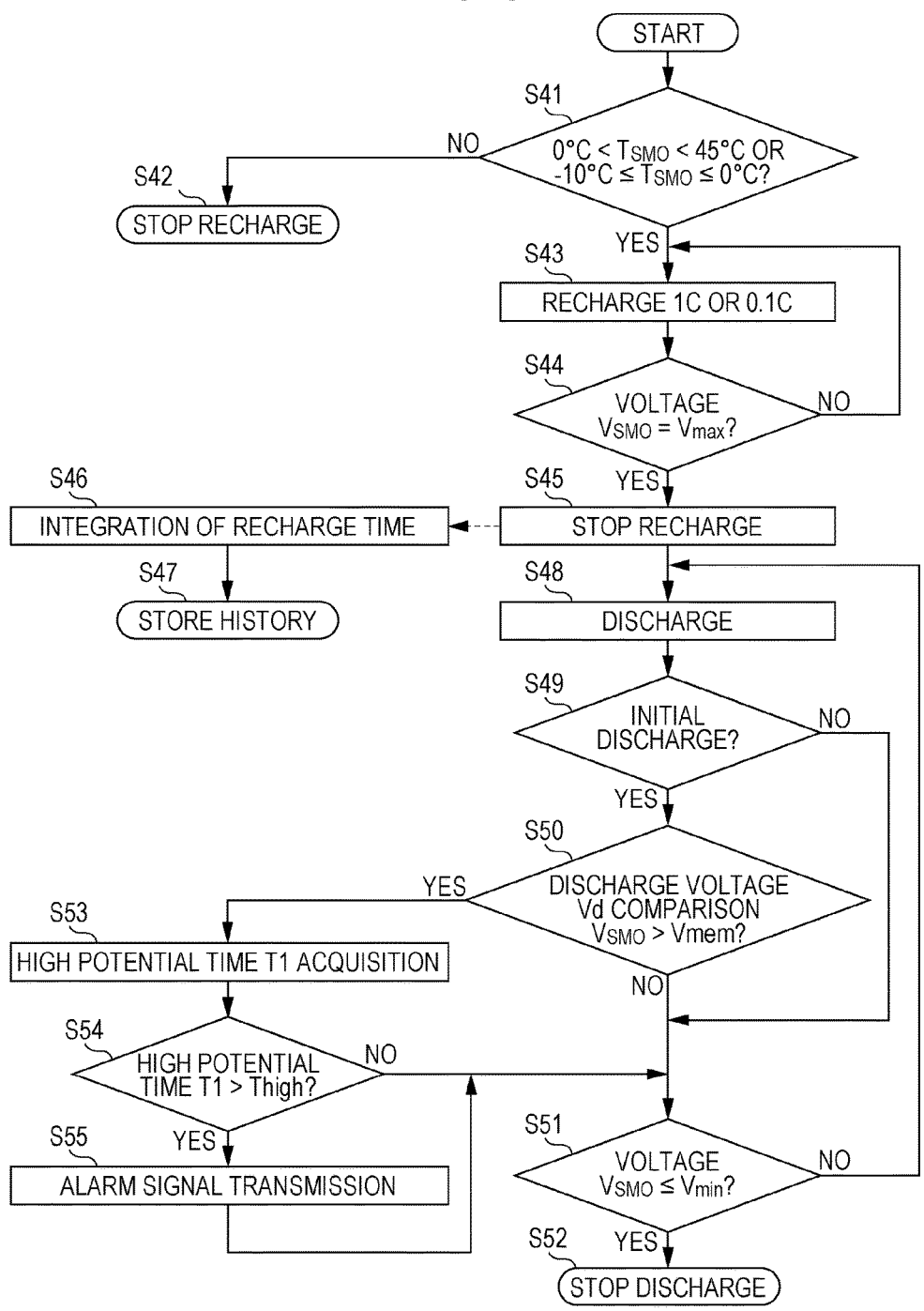
FIG. 8 is a flowchart showing one example of a processing flow in a deterioration detection mode according to certain embodiments.

FIG. 8 is an illustrative flowchart showing an example of embodiments of a processing flow according to the deterioration detection mode. In Step S41, it is determined whether the temperature $T_{SMO}$ of each submodule SMO is within a range of (1) or (2), as described below. Moreover, the temperature $T_{SMO}$ of the submodule SMO is a temperature measured by the temperature measurement portion 15, and in this illustrative example, 16 temperatures $T_{SMO}$ are acquired.

Range (1) is the TSMO is higher than 0 degrees Celsius and lower than 45 degrees Celsius.

Range (2) is the TSMO is higher than −10 degrees Celsius and equal to or lower than 0 degrees Celsius.

If the temperature $T_{SMO}$ of any of the submodules SMO is not within a range of (1) and (2), the process proceeds to Step S42. In Step S42, for example, the recharging process is stopped.

If all of the temperatures $T_{SMO}$ of the 16 submodules SMO are within a range of (1) and (2), the process proceeds to Step S43. In Step S43, the power storage block is recharged with a recharge rate using the recharging device 4.

1C recharging or 0.1C recharging is performed with respect to the power storage module 2. During recharging, the voltage of each submodule SMO is acquired with a predetermined period. The voltages of the 16 submodules SMO (16 items of digital voltage data) acquired at a certain timing are transmitted from the sub-microcontrol unit 25 to the main microcontrol unit 30. In various embodiments, the process proceeds to Step S44.

Moreover, in the determination of Step S41, if the temperature $T_{SMO}$ of the submodule SMO is -10 degrees Celsius<$T_{SMO}$ equal to or lower than 0 degrees Celsius, it may be that the recharging operation is performed with a low current of approximately 0.1C. By performing the recharging at low temperatures with a low current, it is possible to reduce or prevent metallic lithium from newly precipitating on the surface of the anode in the recharging process.

In Step S44, it is determined whether the highest voltage $V_{SMO}$ from the 16 voltages $V_{SMO}$ of the submodules SMO attains the voltage $V_{max}$. This determination, for example, is performed by the main microcontrol unit 30. The voltage $V_{max}$ is set to, for example, approximately 3.5 V.

If the voltage $V_{SMO}$ does not attain the voltage $V_{max}$, the process returns to Step S43 and recharging is continued. The determination of Step S44 is made with respect to the voltage $V_{SMO}$ of the submodules SMO acquired at a timing, for example, the next timing. If the voltage $V_{SMO}$ attains the predetermined voltage $V_{max}$, the process proceeds to Step S45.

In Step S45, the recharging operation is stopped. Moreover, in this illustrative example, the history of recharging is incrementally retained. The history of recharging, for example, in a case where the temperature $T_{SMO}$ of the submodule SMO is -10 degrees Celsius<$T_{SMO}$ equal to or lower than 0 degrees Celsius, the time recharged is integrated. The number of recharges n a case where the temperature $T_{SMO}$ of the submodule SMO is -10 degrees Celsius<$T_{SMO}$ equal to or lower than 0 degrees Celsius may be retained as the history of recharging.

In Step S46, the recharge time is integrated. In Step S47, the integrated time is retained as the history. Moreover, the process according to Step S46 and Step S47, for example, is performed by the controller 3, and the history of recharging is stored in the memory portion 37. The process according to Step S46 and Step S47 may be performed on the power storage module 2 side.

After recharging is stopped in Step S45, the process proceeds to Step S48. In Step S48, the load 5 is connected with respect to the controller 3, and the power storage block is discharged with the predetermined discharge rate. When the discharging is started, the discharge current is measured by the current detection resistance 19. The measured discharge current is supplied to the sub-microcontrol unit 25 via the current detection amplifier 20, ADC 21 or other means.

The sub-microcontrol unit 25 reads out the discharge curve corresponding to the discharge current from the memory portion 26, and acquires the standard voltage $V_{mem}$ from the read out discharge curve. When discharging of the power storage module 2 is started, the voltage $V_{SMO}$ of the 16 submodules SMO (16 items of digital voltage data) is input as voltage information to the sub-microcontrol unit 25 with a period of, for example, 250 ms.

In Step S49, it is determined whether the discharge is in the initial discharge. Because the setting example of the initial discharge was previously described, overlapping description will not be made. If it is an initial discharge, the process proceeds to Step S50. If it is not an initial discharge, the process proceeds to Step S51. If it is not an initial discharge, the processes of Step S50, Step S53, Step S54, and Step S55 do not have to be performed, and discharging may be stopped.

In Step S50, the sub-microcontrol unit 25 compares the highest voltage $V_{SMO}$ among the input voltages $V_{SMO}$ of the 16 submodule SMO with the standard voltage $V_{mem}$.

In the comparison of Step S50, in a case where the voltage $V_{SMO}$ of the submodule SMO is not greater than the standard voltage $V_{mem}$, the process proceeds to Step S51. In Step S51, the lowest voltage $V_{SMO}$ among the voltages $V_{SMO}$ of the 16 submodules SMO and the voltage $V_{min}$ are compared. The voltage $V_{min}$ is set to a voltage (for example, approximately 2.0 V) above which discharging becomes unfavorable. The voltage $V_{min}$ may be set to a predetermined voltage (for example, approximately 2.5 V).

In a case where the voltage $V_{SMO}$ is lower than the voltage $V_{min}$ in the determination process of Step S51, the process proceeds to Step S52 and discharging is stopped. In a case where the voltage $V_{SMO}$ is greater than the voltage $V_{min}$ in the determination process of Step S51, the process returns to Step S48 and discharging is continued.

In the comparison process of Step S50, in a case where the highest voltage $V_{SMO}$ of the submodule SMO is greater than the standard voltage $V_{mem}$ (e.g., high potential), the process proceeds to Step S53. In Step S53, a process is performed acquiring a time (high potential time) T1 in which the voltage $V_{SMO}$ of the submodule SMO is greater than the standard voltage $V_{mem}$. The high potential time T1, for example, may be acquired with the affirmative count in the determination process of Step S50 with the period (sampling period) at which the voltage $V_{SMO}$ of the submodule SMO is measured. When the high potential time T1 is acquired, the process proceeds to Step S54.

In Step S54, the sub-microcontrol unit 25 determines whether the high potential time T1 is greater than a threshold $T_{high}$. The threshold $T_{high}$ is suitably set to a value at which deterioration of the submodule SMO is able to be reliably determined. In a case where the high potential time T1 is lower than threshold $T_{high}$, the process proceeds to Step S51.

In a case where the high potential time T1 is greater than threshold $T_{high}$, the presence of deterioration of the submodule SMO is determined. In Step S55, a process is performed reporting the deterioration of the submodule SMO. For example, the main microcontrol unit 30 performs a process notifying the user of an anomaly (deterioration) of the power storage module 2 through sound, display or other notification means, and the user is prompted to inspect or replace, for example, the power storage module 2.

As described above, as an illustrative example, by detecting the period of high potential in the initial discharge, deterioration of the cell and submodule, as well as deterioration of the power storage module using the submodule, may be detected. The presence of deterioration may be rapidly detected simply by monitoring the voltage of the submodule SMO in the initial discharge.

Moreover, the timing at which the processing is performed according to the deterioration detection mode may be appropriately set, for example, during activation of the control system 1. Whether the determination process is performed may be determined by referring to the history (e.g., log) obtained with the processes in Step S46 and Step S47. That is, the history may be referenced, and if at least one of the number of recharges in low temperatures (for example, at −10 degrees Celsius<$T_{SMO}$ equal to or lower than 0 degrees Celsius) and the recharging time is greater than a threshold, the determination process may be performed.

Moreover, the presence of deterioration of the submodule SMO may be determined using the ratio (appropriately referred to as deltaQ/deltaV) of changes in the voltage (deltaV) with respect to changes in the capacity (deltaQ) of the cell. Changes in the capacity (deltaQ), for example, are acquired with a predetermined period (for example, approximately 250 ms). Changes in the capacity (deltaQ) may be acquired by the product of the discharge current and the elapsed time. Capacitance may be in cell units or in submodule SMO units.

Figure 9:
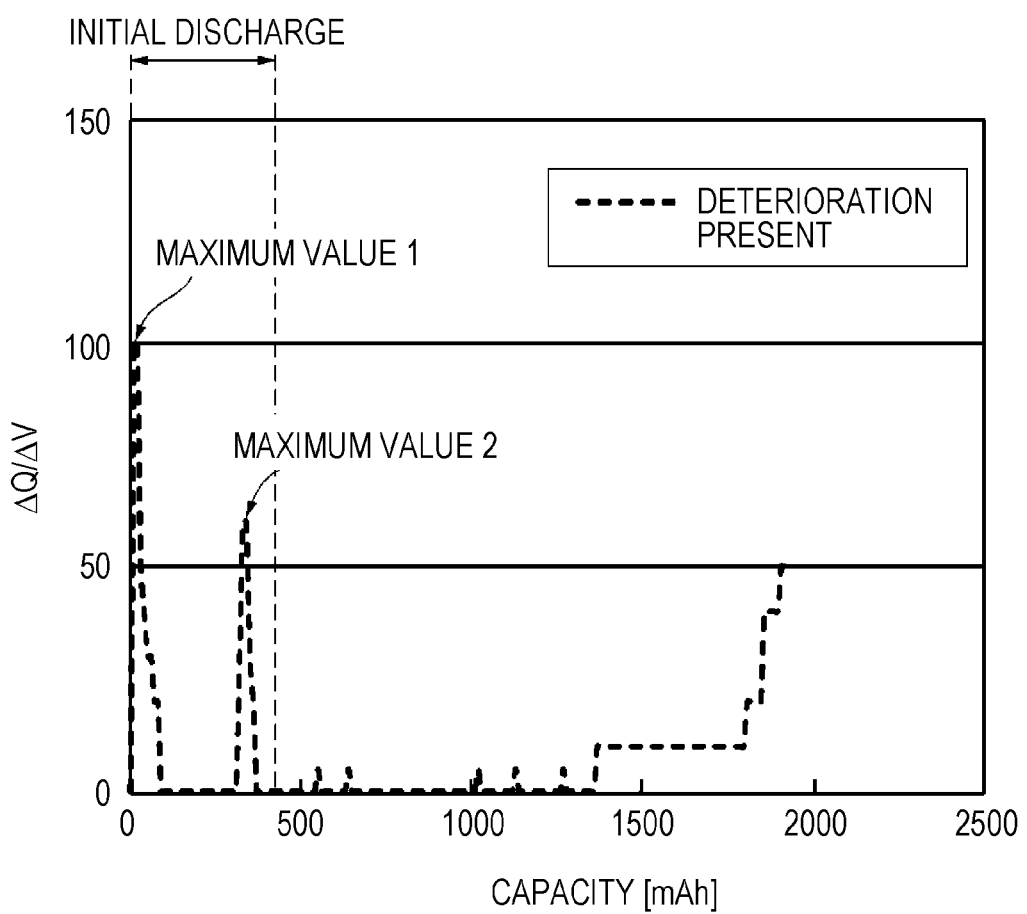
FIG. 9 is a diagram for describing one example of changes in capacity and changes in deltaQ/deltaV during discharging according to certain embodiments.

FIG. 9 is an illustrative graph showing an example of embodiments of changes in deltaQ/deltaV of the submodule SMO in which deterioration occurs. As shown in the diagram, a maximum value 1 and maximum value 2 exceeding a threshold (for example, 50) in the initial discharge are shown. The maximum value 1 corresponds to the lowering of the voltage of a cell when connected to a load with respect to the power storage module 2. The maximum value 2 corresponds to lowering the cell voltage from a high potential to a standard voltage by dissolving metallic lithium precipitated on the surface of an anode.

If the cell is normal, because there is no high potential period, the maximum value 2 does not appear in the change of deltaQ/deltaV. That is, in a case where the presence of the maximum value 2 is determined, and the maximum value 2 is detected, it is possible to detect the presence of deterioration in the submodule SMO by the cell being deteriorated.

[Processing According to Recovery Mode]

Figure 10:
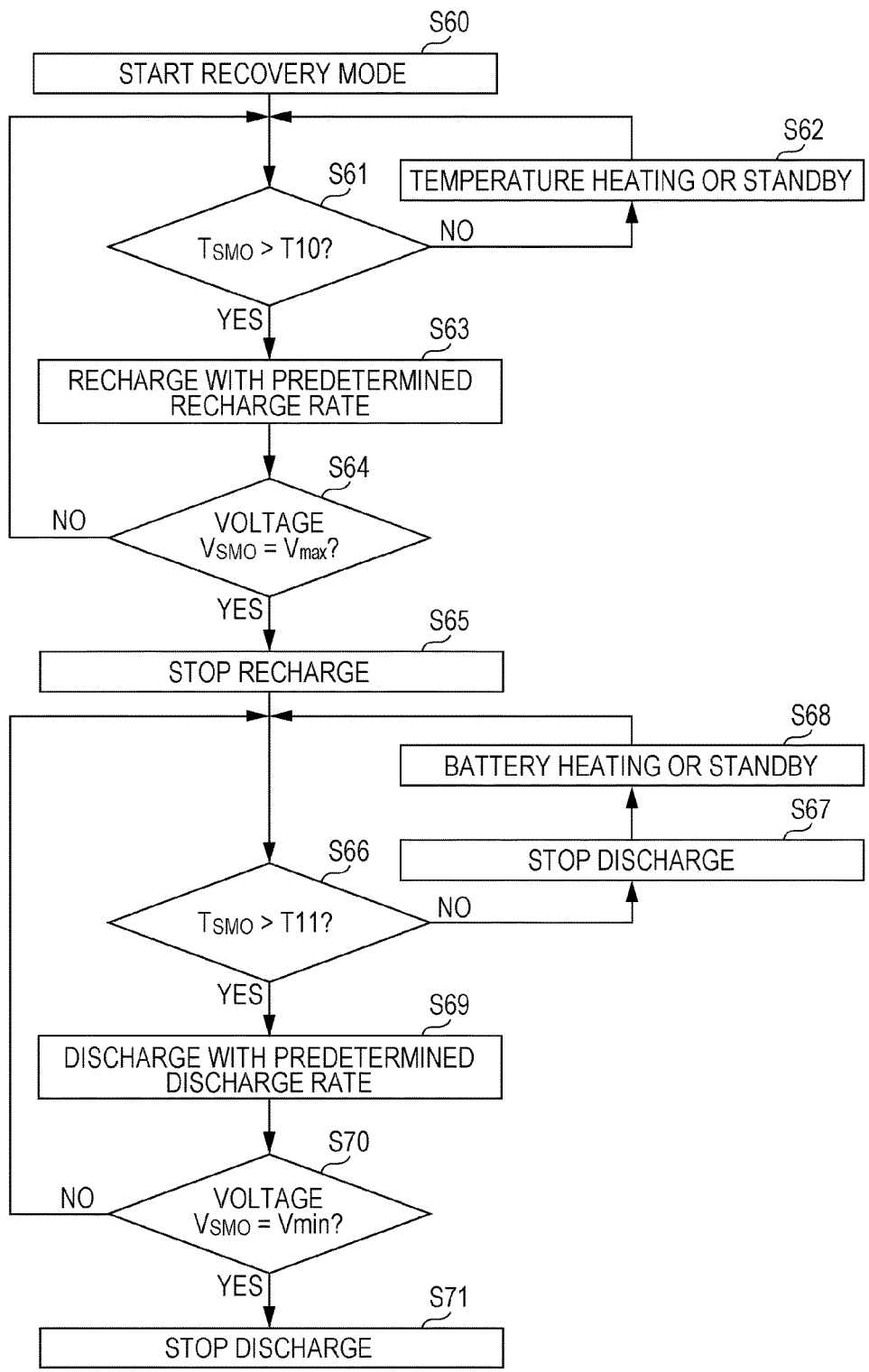
FIG. 10 is a flowchart showing one example of a processing flow in a recovery mode according to certain embodiments.

FIG. 10 is an illustrative flowchart showing an example of embodiments of a processing flow according to the recovery mode. In Step S60, processing according to the recovery mode is started.

In Step S61, the main microcontrol unit 30 determines whether the lowest temperature $T_{SMO}$ of the temperatures of the 16 submodules SMO is greater than a temperature T10. The temperature T10 is set to approximately room temperature (for example, about 15 degrees Celsius). In a case where the temperature $T_{SMO}$ is lower than the temperature T10, the process proceeds to Step S62. In multiple embodiments, in the first determination, the process proceeds to Step S62.

In Step S62, the main microcontrol unit 30 instructs warming of the submodule SMO with respect to the sub-microcontrol unit 25. The sub-microcontrol unit 25 warms the submodule SMO by a current flowing in the resistance power lines which are one illustrative example of a warming portion 22 according to the instruction of main microcontrol unit 30. After the current flows in the resistance power lines for a predetermined time, the process stands by, and the determination is performed again according to Step S61. Moreover, while warming the submodule SMO, the determination according to Step S61 may be performed.

If the temperature $T_{SMO}$ is greater than the temperature T10 in the determination in Step S61, the process proceeds to Step S63. In Step S63, recharging is performed with the predetermined recharge rate using the recharging device 4. The predetermined recharge rate may be approximately 1C; however, the rate may beset in a range from about 0.1C to about 0.2C. The recharge rate is set by the main microcontrol unit 30, and instructed with respect to the recharge voltage and recharge current control portion 4a from the main microcontrol unit 30.

In Step S64, the main microcontrol unit 30 determines whether the highest voltage $V_{SMO}$ of the voltages of the 16 submodules SMO attains the voltage $V_{max}$. The voltage $V_{max}$ is set to, for example, a full recharge voltage of approximately 4.2 V. In a case where the voltage $V_{SMO}$ does not attain the voltage $V_{max}$, the process returns to Step S61. Moreover, in this example, monitoring of the temperature $T_{SMO}$ in Step S61 may be performed while recharging. If the temperature $T_{SMO}$ is lower that the temperature T10, the recharging may be stopped; however, because repeating the starting and stopping of recharging may not be preferable in various embodiments, it may be more desirable that the recharging be continued even if the temperature $T_{SMO}$ is lower that the temperature T10. If the voltage $V_{SMO}$ attains the predetermined voltage $V_{max}$, the process proceeds to Step S65. In Step S65, the recharging operation is stopped.

In Step S66, the main microcontrol unit 30 determines whether the lowest temperature $T_{SMO}$ of the temperatures of the 16 submodules SMO is greater than the temperature T11. The temperature T11 is set to approximately room temperature, for example, approximately 15 degrees Celsius, which may be similar to temperature T10. Naturally, the temperature T11 may be set to a temperature different from the temperature T10. In a case where the temperature $T_{SMO}$ is lower than the temperature T11, the process proceeds to Step S67.

In Step S67, in a case where discharging of the power storage module 2 is performed, the discharging is stopped.

In Step S68, the main microcontrol unit 30 instructs warming of the submodule SMO with respect to the sub-microcontrol unit 25. The sub-microcontrol unit 25 warms the submodule SMO by a current flowing in the resistance power lines, which is one example of a warming portion 22 according to the instruction of the main microcontrol unit 30. After the current flows in the resistance power lines for a predetermined time, the process stands by, and the determination is performed again according to Step S66. Moreover, while warming the submodule SMO, the determination according to Step S66 may be performed.

In a case where temperature $T_{SMO}$ is greater than the temperature T11 in the determination in Step S66, the process proceeds to Step S69. In Step S69, discharging is performed with the predetermined discharge rate using the load 5. The predetermined discharge rate may be set to a value lower than 0.2C; and may be set to a value in a range from approximately 0.1C to approximately 0.2C. In this example, setting the discharge rate to approximately 0.1C is described. The discharge rate is set by the main microcontrol unit 30, and instructed with respect to the discharge current control portion 5a from the main microcontrol unit 30.

By discharging with a low discharge current (gentle discharging), the metallic lithium precipitated on the surface of the anode is dissolved, and it is possible to stabilize the discharge potential of the lithium ion secondary battery. Furthermore, by performing gentle discharging after the temperature during discharging is raised to approximately 15 degrees Celsius, it is possible to promote dissolving of the metallic lithium by lowering the discharge resistance.

In Step S70, the main microcontrol unit 30 determines whether the lowest voltage $V_{SMO}$ of the voltages of the 16 submodules SMO is the voltage $V_{min}$. The voltage $V_{min}$ is set, for example, in a range from approximately 2.0 V to approximately 2.7 V. If the voltage $V_{SMO}$ is not $V_{min}$ the process returns to Step S66, and the determination of Step S66 is performed. In a case where the voltage $V_{SMO}$ is the voltage $V_{min}$ the process proceeds to Step S71, and discharging is stopped.

As described above, in the processing according to the recovery mode, by appropriately performing gentle discharging while warming the power storage module, metallic lithium precipitated on the surface of the anode is dissolved. Moreover, in the process according to the recovery mode, because discharging with the low current is performed, recharging is performed once in Step S63. However, with the stage starting processing according to the recovery mode, if the voltage $V_{SMO}$ of the submodule SMO is the full recharge voltage or a voltage close thereto, the processes (for example, the processes of Step S61 to Step S65) of recharging in the recovery mode do not have to be performed.

Moreover, recharging is performed after the processing according to the recovery mode, as described using FIG. 2, for example. After recharging is finished, the power storage module 2 is connected to the load 5, and the power storage module 2 is discharged.

Example of Effects

Figure 11:
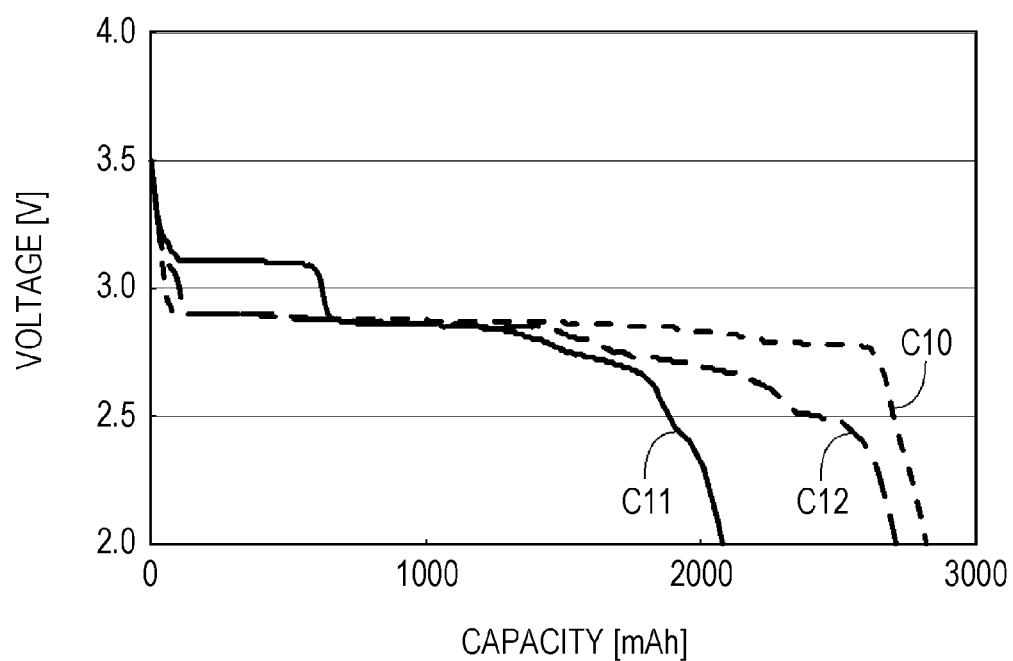
FIG. 11 is a diagram for describing one example of an effect according to certain embodiments.

One illustrative example of the effects of the processing according to the recovery mode will be described. The curve C10 in FIG. 11 shows various embodiments of the discharge curve of a normal cell. The curve C11 shows the discharge curve of a cell in which deterioration occurs. The curve C12 shows a discharge curve of a cell subjected to a process according to a recovery mode.

As shown by the curve C12, for a cell subjected to processing according to the recovery mode, because the metallic lithium on the surface of the anode dissolves, locations of high potential (for example, approximately 3.1 V) in the initial discharge are reduced or eliminated, and the discharge potential stabilizes or improves its stabilization. Furthermore, the capacity recovers to a value close to the capacity of a normal cell (e.g., approximately 2800 to approximately 2900 mAh).

Figure 12A:
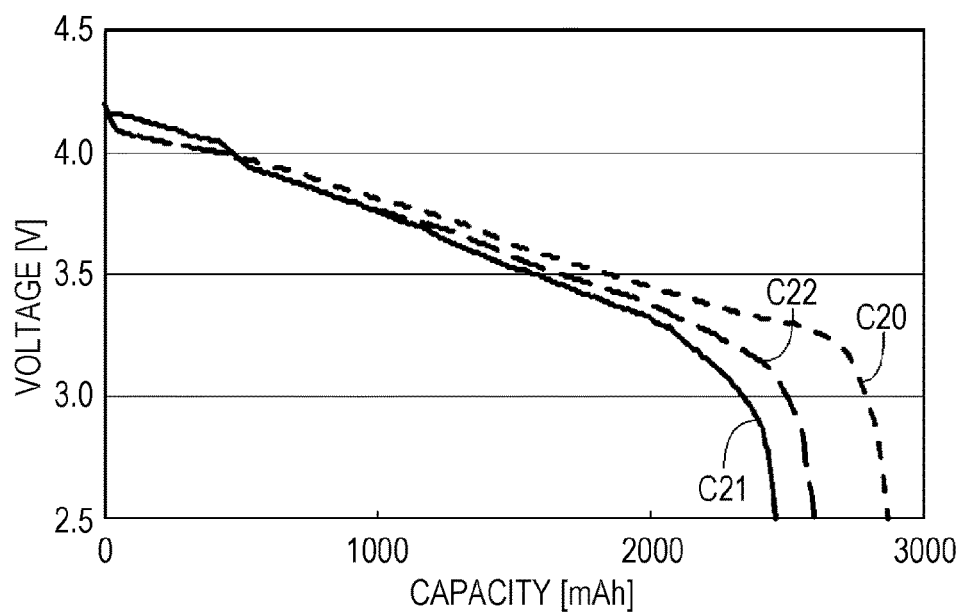
FIG. 12A is a diagram for describing one example of an effect according to certain embodiments.

The processing according to the recovery mode is also appropriate with respect to a lithium ion secondary battery with a discharge curve without flats. Examples of a lithium ion secondary battery with a discharge curve without flats include lithium ion secondary batteries in which a cobalt-based, nickel-based, or other material is used as the cathode material. FIG. 12A shows an illustrative discharge curve of such embodiments of a lithium ion secondary battery. In FIG. 12A, curve C20 shows the discharge curve of a normal cell, and curve C21 shows the discharge curve of a cell in which deterioration occurs. As shown by curve C21, locations of high potential (for example, approximately 4.15 V to approximately 4.2 V) are expressed in the initial discharge. The curve C22 shows a discharge curve of a cell subjected to processing according to a recovery mode. As shown by curve C22, the capacity of a cell subjected to processing according to a recovery mode recovers.

Figure 12B:
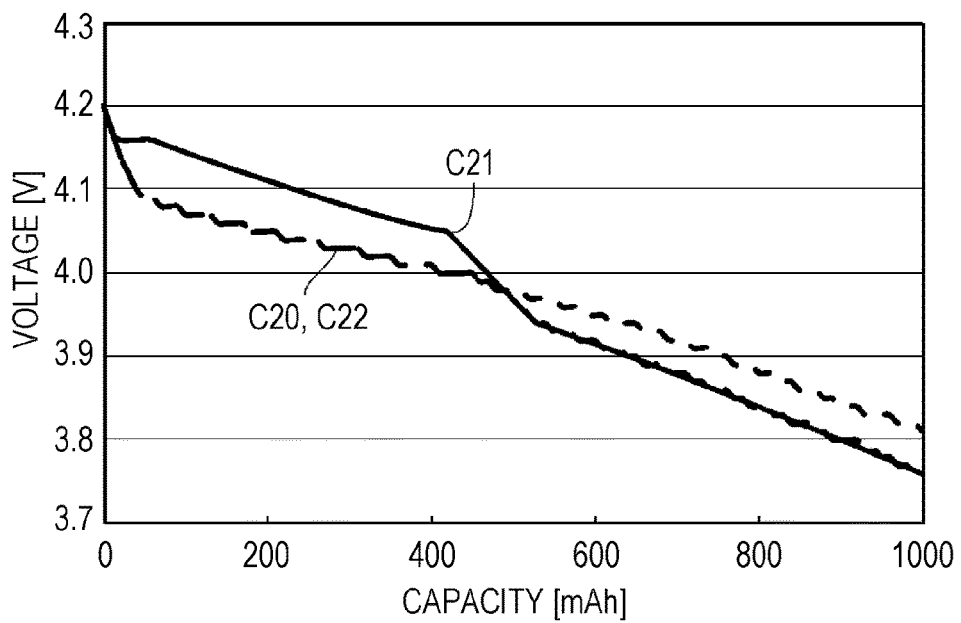
FIG. 12B is a diagram for describing one example of an effect according to certain embodiments.

FIG. 12B is an illustrative diagram in which the locations of initial discharge in FIG. 12A are expanded. As shown by curve C22, for a cell subjected to processing according to the recovery mode, the locations of high potential are eliminated, and the discharge potential stabilizes.

Figure 13:
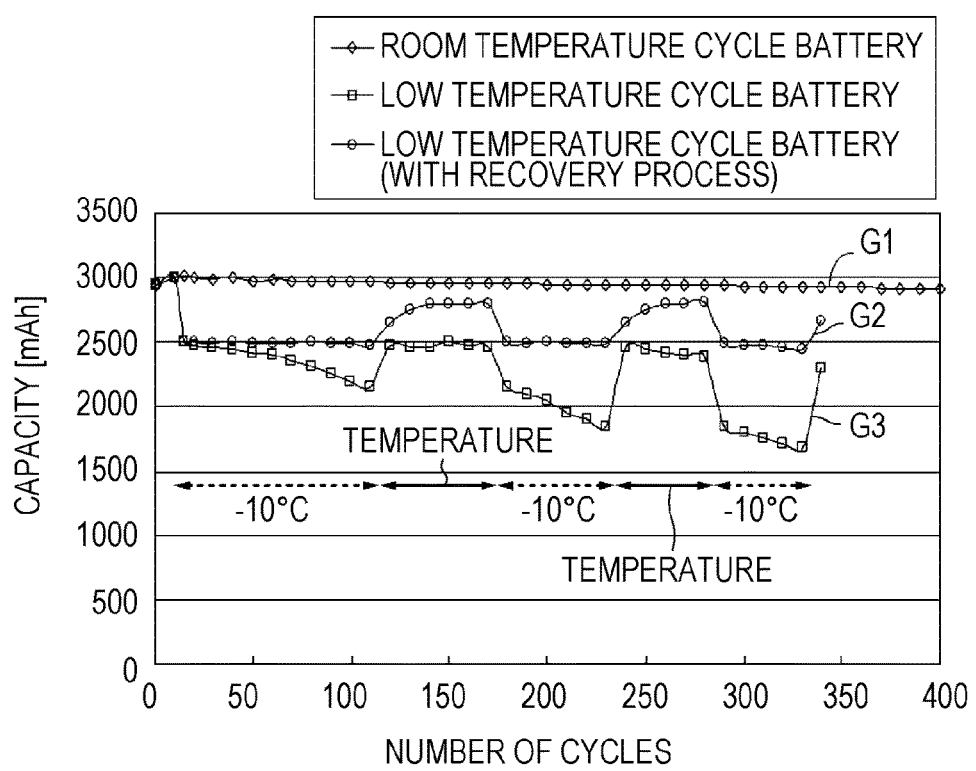
FIG. 13 is a diagram for describing one example of an effect according to certain embodiments.

FIG. 13 shows an illustrative example of embodiments of the results of performing recharging and discharging with a 340 cycle with respect to a lithium ion secondary battery. The graph G1 on which diamonds are plotted shows the results of performing recharging and discharging with a 340 cycle (1C recharging 1C discharging) at room temperature (approximately 15 degrees Celsius). The cycle conditions are a cycle initial performance at −10 degrees Celsius of a 100 cycle, and thereafter a 50 cycle repeating between room temperature and −10 degrees Celsius. As shown by the graph G1, lowering of the capacity does not substantially occur.

The graph G2 on which squares are plotted and the graph G3 on which circles are plotted show the results in which a charging and recharging cycle is repeated at −10 degrees Celsius and room temperature with respect to a cell before deterioration. Here, graph G2 shows the results in which the discharging current is set to 0.1C at room temperature, and graph G3 shows the results in which the discharging current is set to 1C at room temperature. As shown in the diagram, the capacity recovers better when discharging is performed at room temperature with a low current.

Table 1 shows one example of the capacity maintenance rate in a case where the discharge rate in the recovery mode process (e.g., the discharge rate in Step S69 in FIG. 10) is changed. The term "capacity maintenance rate" means the ratio with respect to the capacity of a normal cell (rating). The capacity of a normal cell is, for example 3000 mAh. Moreover, the cycle conditions, for example, are similar conditions as the 340 cycle described above.

TABLE 1

| Discharging current | Capacity | Capacity maintenance rate |
| --- | --- | --- |
| 0.1 C | 2660 mAh | 89% |
| 0.2 C | 2580 mAh | 86% |
| 0.5 C | 2410 mAh | 80% |
| 1.0 C | 2300 mAh | 77% |

The capacity after recovery in a case where the discharge rate is set to 0.1C becomes 2660 mAh, and the capacity maintenance rate becomes 89%. The capacity after recovery in a case where the discharge rate is set to 0.2C becomes 2580 mAh, and the capacity maintenance rate becomes 86%. The capacity after recovery in a case where the discharge rate is set to 0.5C becomes 2410 mAh, and the capacity maintenance rate becomes 80%. The capacity after recovery in a case where the discharge rate is set to 1.0C becomes 2300 mAh, and the capacity maintenance rate becomes 77%. Here, in practical use, in a case where the capacity maintenance rate should be set to 85% or higher, it may be desirable that the discharge rate be set to a value lower than approximately 0.2C. Furthermore, it may be desirable that the discharge rate be set to between approximately 0.1C to approximately 0.2C, in consideration of the discharge time.

Table 2 shows one example of the capacity maintenance rate in a case where the temperature in the recovery mode process (e.g., the temperature T11 in Step S66 in FIG. 10) is changed. Moreover, the cycle conditions, for example, are similar conditions as the 340 cycle described above.

TABLE 2

| Temperature | Capacity | Capacity maintenance rate |
| --- | --- | --- |
| 25 degrees Celsius | 2660 mAh | 89% |
| 15 degrees Celsius | 2610 mAh | 87% |
| 5 degrees Celsius | 2520 mAh | 84% |

The capacity after recovery in a case where the temperature T11 is set to 25 degrees Celsius becomes 2660 mAh, and the capacity maintenance rate becomes 89%. The capacity after recovery in a case where the temperature T11 is set to 25 degrees Celsius becomes 2610 mAh, and the capacity maintenance rate becomes 87%. The capacity after recovery in a case where the temperature T11 is set to 5 degrees Celsius becomes 2520 mAh, and the capacity maintenance rate becomes 84%. In practical use, in a case where the capacity maintenance rate should be set to 85% or higher, the temperature T11 is set to a value higher than 15 degrees Celsius, it may be desirable that the temperature of the cell (or submodule SMO) is increased to a temperature higher than approximately 15 degrees Celsius.

[Modification Examples]

Embodiments of the present disclosure have been described in detail above; however, the present disclosure is not limited to each of the above-described embodiments, and various modifications based on the technical ideas of the present disclosure are possible.

The above-described embodiments have been described using the example of a lithium ion secondary battery; however, application of the processing according to the recovery mode is possible with respect to another secondary battery. Furthermore, processing according to the recovery mode in the above-described embodiment may be performed at fixed intervals.

In the embodiment described above, a configuration warming a power storage portion by a warming portion, such as resistance lines, is set. Warming of the power storage portion is not limited to warming by a warming portion and self-heating accompanying recharging and discharging of the power storage portion or temperature increases in the external air temperature, or a combination thereof may be performed. In the case of warming by temperature increases in the external air temperature, for example, the process of Step S68 in FIG. 10 becomes a standby process.

The configurations, methods, processes, shapes, materials, and numerical values exemplified in the embodiments described above are only examples, and different configurations, methods, processes, shapes, materials, and numerical values may be used as necessary. In addition, the configurations, methods, processes, shapes, materials, and numerical values of the embodiments described above may be combined with one another within a range not technically inconsistent.

The present disclosure may be applied to a so-called cloud system in which the processes exemplified are distributed and performed by a plurality of devices. The present disclosure may be realized as a system in which the exemplified processes in the embodiments and modification examples are executed, and a device in which at least a portion of the exemplified processes is executed.

Furthermore, the present disclosure is not limited to a device, and may be realized, for example, as a method, a program or a recording medium on which a program is recorded.

The present disclosure may take the following configuration.

(1) A control device includes: a determination portion determining whether a temperature of a power storage portion is higher than a predetermined temperature; a control portion discharging the power storage portion with a predetermined discharge rate in a case where the temperature of the power storage portion is determined to be higher than the predetermined temperature, and discharging the power storage portion with the discharge rate after the temperature of the power storage portion is made higher than the predetermined temperature by warming the power storage portion in a case where the temperature of the power storage portion is determined to be lower than the predetermined temperature.

(2) The control device according to (1) in which warming of the power storage portion is performed by any of resistance power lines provided in proximity to the power storage portion, self-heating accompanying recharging and discharging of the power storage portion and temperature increases in external air temperature.

(3) The control device according to (1) or (2), in which the predetermined discharge rate is set to a value smaller than 0.2C.

(4) The control device according to (3), in which the predetermined discharge rate is set to a value from 0.1C to 0.2C.

(5) The control device according to any one of (1) to (4) in which the predetermined temperature is set to 15 degrees Celsius.

(6) The control device according to any of (1) to (5), in which the control portion recharges the power storage portion until the voltage of the power storage portion becomes a predetermined voltage with a predetermined recharge rate of between from 0.1C to 0.2C; and the determination portion performs determination after the discharging is finished.

(7) The control device according to (6), in which the determination portion determines whether the temperature of the power storage portion is higher than a predetermined temperature before the recharging is performed; the control portion recharges the power storage portion with the recharge rate in a case where the temperature of the power storage portion is determined to be higher than the predetermined temperature, and recharges the power storage portion with the recharge rate after the temperature of the power storage portion is made higher than the predetermined temperature by warming the power storage portion in a case where the temperature of the power storage portion is determined to be lower than the predetermined temperature.

(8) The control device according to any of (1) to (7), further including a deterioration determination portion determining the presence of deterioration of the power storage portion, in which the determination portion determines whether the temperature of the power storage portion is higher than the predetermined temperature in a case where it is determined that deterioration of the power storage portion is present by the deterioration determination portion.

(9) The control device according to (8), in which the power storage portion includes one or a plurality of non-aqueous batteries provided with a cathode and an anode having an active material able to intake and discharge lithium.

(10) The control device according to (9), in which the deterioration determination portion determines deterioration of the power storage portion in a case where the voltage of the power storage portion in the initial discharge is a voltage caused by the occurrence of precipitation of metallic lithium on the surfaces of the anode.

(11) The control device according to any of (1) to (10), in which the control portion performs according to the temperature of the power storage portion any of recharging with a first recharge rate with respect to the power storage portion, recharging with a second recharge rate lower than the first recharge rate with respect to the power storage portion and warming with respect to the power storage portion after the discharging.

(12) The control device according to claim (11), in which the control portion performs recharging with the second recharge rate in a case where the temperature of the power storage portion is higher than a first temperature and lower than a second temperature; performs recharging with the first recharge rate in a case where the temperature of the power storage portion is higher than the second temperature; and performs warming with respect to the power storage portion in a case where the temperature of the power storage portion is lower than the first temperature.

(13) The control device according to (12), in which the power storage portion is recharged until the voltage of the power storage portion becomes the full recharge voltage in a case of recharging with the first recharge rate; and the power storage portion is recharged until the voltage of the power storage portion becomes a voltage lower than the full recharge voltage in a case of recharging with the second recharge rate.

(14) The control device according to (12) or (13), in which the first temperature is −10 degrees Celsius, and the second temperature is 0 degrees Celsius.

(15) A control method in a control device, including: determining whether a temperature of a power storage portion is higher than a predetermined temperature; discharging the power storage portion with a predetermined discharge rate in a case where the temperature of the power storage portion is determined to be higher than the predetermined temperature; and discharging the power storage portion with the discharge rate after the temperature of the power storage portion is made higher than the predetermined temperature by warming the power storage portion in a case where the temperature of the power storage portion is determined to be lower than the predetermined temperature.

(16) A control system including: a determination portion determining whether a temperature of a power storage portion is higher than a predetermined temperature; a control portion discharging the power storage portion with a predetermined discharge rate in a case where the temperature of the power storage portion is determined to be higher than the predetermined temperature, and discharging the power storage portion with the discharge rate after the temperature of the power storage portion is made higher than the predetermined temperature by warming the power storage portion in a case where the temperature of the power storage portion is determined to be lower than the predetermined temperature.

(17) An electric vehicle, including the control device according to (1).

(18) A battery package including: a power storage portion; and a control device, where the control device determines if a first temperature of the power storage portion is higher than a predetermined temperature, and if the first temperature is higher than the predetermined temperature, discharges the power storage portion at a first discharge rate.

(19) The battery package of (18), where the control device includes a recovery mode including the steps of the determining and the discharging, and the recovery mode occurs after a deterioration is detected in the power storage portion.

(20) The battery package of (19), where a capacity of the battery package after the recovery mode remains within about 500 mAh of a capacity of the battery package before the recovery mode between a sequential set of 250-300 cycles and when the battery package is at temperatures below about −10 degrees Celsius for a sequential set of 0-300 cycles that includes the set of 250-300 cycles.

(21) The battery package of (18), where if the first temperature is higher than the predetermined temperature due to a warming device supplying heat to the power storage portion, the discharge of the power storage portion occurs at a second discharge rate.

(22) The battery package of (18), where the first discharge rate is a predetermined rate. (23) The battery package of (18), where the first discharge rate is lower than about 0.2C. (24) The battery package of (18), where the second discharge rate is between about 0.2C and about 0.1C. (25) The battery package of (18), where the first discharge rate is about 0.1C. (26) The battery package of (18), where: after the discharging the power storage portion at the first discharge rate, a warming device supplies heat to the power storage portion when the power storage portion is at a lower temperature than the predetermined temperature, the control device determines if a second temperature of the power storage portion is higher than the predetermined temperature, and if the second temperature is higher than the predetermined temperature, the control device discharges the power storage portion at a second discharge rate.

(27) The battery package of (26), where the second discharge rate is the same as the first discharge rate.

(28) The battery package of (26), where the second discharge rate is different than the first discharge rate. (29) The battery package of (26), where the second discharge rate is lower than about 0.2C. (30) The battery package of (26), where the second discharge rate is about 0.1C. (31) The battery package of (26), where the power storage portion includes a set of power storage submodules. (32) The battery package of (31), where the control device determines if any of an initial temperature of each one of the power storage submodules is higher than the predetermined temperature, and if any of the initial temperatures is higher than the predetermined temperature, the control device discharges the power storage portion at the first discharge rate. (33) The battery package of (32), where the control device discharges the power storage submodules using at least two different discharge rates for at least two different power storage submodules. (34) A battery adapted for use with an electronic device, where the battery includes the battery package of (18). (35) The battery of (34), where the electronic device is a vehicle.

(36) A battery package adapted for use with a power storage device, including: a power storage portion; and a control device, where the control device functions to determine if a first temperature of a power storage portion is higher than a predetermined temperature, and if the first temperature is higher than the predetermined temperature, discharge the power storage portion at a predetermined first discharge rate.

(37) A method of controlling power storage in a battery package, including: determining if a first temperature of the power storage portion is higher than a predetermined temperature, and if the first temperature is higher than the predetermined temperature, discharging the power storage portion at a predetermined first discharge rate.

(38) A vehicle including the battery package of (18).

(39) The battery package of (18), where the control device performs, depending on a temperature of the power storage portion, at least one of: recharging the power storage portion with a first recharge rate; recharging the power storage portion with a second recharge rate that is lower than the first recharge rate; and warming the power storage portion after the discharging.

(40) The battery package of (39), where the control device performs recharging with the second recharge rate when the temperature of the power storage portion is higher than an initial temperature and lower than a secondary temperature; performs recharging with the first recharge rate when the temperature of the power storage portion is higher than the secondary temperature; and performs warming of the power storage portion in a case where the temperature of the power storage portion is lower than the initial temperature.

(41) The battery package of (39), where the power storage portion is recharged until the voltage of the power storage portion becomes a full recharge voltage when the recharging is with the first recharge rate; and the power storage portion is recharged until the voltage of the power storage portion becomes a voltage lower than the full recharge voltage when the recharging is with the second recharge rate.

(42) The battery package of (39), where the initial temperature is about −10 degrees Celsius, and the secondary temperature is about 0 degrees Celsius.

[Application Examples]
[Power Storage Unit in Home as Application Example]

Figure 14:
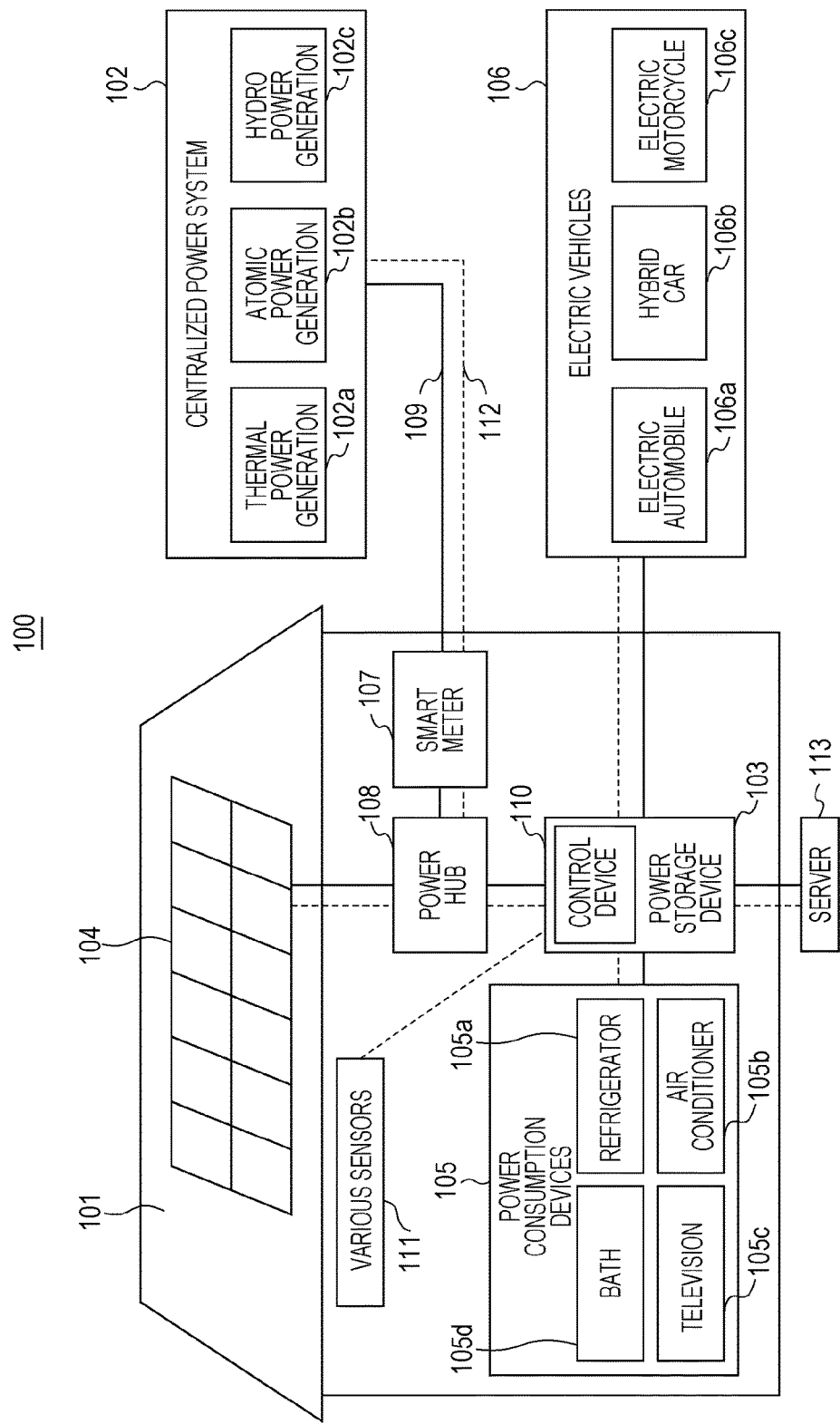
FIG. 14 is a diagram for describing an application example according to certain embodiments.

The present disclosure will be described with reference to FIG. 14 as an illustrative example applied to embodiments of a power storage unit for use in a home. For example, in a power storage unit 100 for use in a home 101, power is supplied to the power storage device 103 from a centralized power generation system 102, such as a thermal power generation 102a, atomic power generation 102b, or hydro power generation 102c, via a power network 109, an information network 112, a smart meter 107, or a power hub 108, among others. Along with these, power is supplied from an independent power supply, such as a domestic power generation device 104, to a power storage device 103. The power supplied to the power storage device 103 is stored. The power used in the home 101 is supplied using the power storage device 103. A similar power storage unit may be used in relation to a building without being limited to the home 101.

The power storage device 103 may be installed outside according to the case inside the home. In low temperature regions, such as Hokkaido, there are cases where the air temperature outside in the winter lowers to approximately −20 degrees Celsius. Even in cases where the power storage device 103 is used in such an environment, it is possible to correctly discriminate the state of the power storage device 103 according to the present technology, and further, in a case where the performance of the power storage device 103 is deteriorated, it is possible to recover the performance thereof.

In the home 101, a domestic power generating device 104, power consumption devices 105, a power storage device 103, a control device 110 controlling each device, a smart meter 107, and sensors 111 acquiring a variety of information are provided. Various devices are connected by a power network 109 and an information network 112. Power generated by using a solar cell, fuel cell or other means as the domestic power generation device 104 is supplied to either or both of a power consumption device 105 and a power storage device 103. The power consumption device 105 is a refrigerator 105a, an air conditioning device 105b, a television receiver 105c, or a bath 105d, among others. Furthermore, an electric vehicle 106 is included in the power consumption device 105. The electric vehicle 106 is an electric automobile 106a, a hybrid car 106b, or an electric motorcycle 106c.

The power storage device 103 is configured from a secondary battery or a capacitor. For example, the power storage device is configured from a lithium ion secondary battery. As the power storage device 103 the above-described power storage module 2 may be used. The lithium ion secondary battery may be a fixed type, or may be used in an electric vehicle 106. The smart meter 107 is provided with a function measuring the use amount of commercial power, and transmitting the measured use amount to a power company. The power network 109 may be any one of a direct current power supply, an alternating current power supply, a non-contact power supply, or may be a combination of a plurality thereof.

The various sensors 111 are, for example, presence sensors, illumination sensors, object detection sensors, power consumption sensors, sway sensors, contact sensors, temperature sensors, and infrared sensors, among others. The information acquired by the various sensors 111 is transmitted to the control device 110. It is possible to minimize the energy consumption by automatically controlling the power consumption devices 105 by ascertaining the state of the weather, and the state of a person, among others, according to the information from the sensors 111. Furthermore, the control device 110 is able to transmit information relating to the home 101 via the Internet to an external power company, for example.

Processing, such as branching of power lines or direct current-alternating current conversion are performed by the power hub 108. As the communication method of the information network 112 connected to the control device 110, there are methods using a communication interface, such as a UART (Universal Asynchronous Receiver-Transceiver: asynchronous serial communication transmission-reception circuit) or other interfaces, and methods using a sensor network according to a wireless communication standard, such as Bluetooth (registered trademark), ZigBee (registered trademark), and Wi-Fi (registered trademark), among others. The Bluetooth method is applied to multimedia communication, and is able to perform one-to-may communication. ZigBee uses the physical layer of IEEE (Institute of Electrical and Electronics Engineers) 802.15.4. IEEE 802.15.4 is a name for a short range wireless communication network called a PAN (Personal Area Network) or a W (Wireless) PAN.

The control device 110 is connected to an external server 113. The server 113 may be managed by any of the home 101, power company, or a service provider. The information transmitted and received by the server 113, for example, is power consumption information, daily life pattern information, power charges, weather information, natural disaster information, and information relating to power transactions, among other information. This information may be transmitted and received from a power consumption device inside the house (for example, a television receiver), or may be transmitted and received from a device outside the house (for example, a mobile telephone, or other device). This information may be displayed by a device having a display function, for example, a television receiver, a mobile telephone, and a PDA (Personal Digital Assistants), among others.

The control device 110 controlling each portion is configured of a CPU, RAM, or ROM, among others, and in this example, is accommodated in the power storage device 103. As functions of the control device 110, for example, functions of each portion of the power storage module 2 such as the sub-microcontrol unit 25, or the functions of the main microcontrol unit 30 may be applied. The control device 110 is connected by the information network 112 to the power storage device 103, the domestic power generation device 104, the power consumption device 105, various sensors 111, and the server 113, and has a function adjusting, for example, the use amount of commercial power and the power generation amount. Moreover, in addition thereto, the control device may be provided with a function performing power transactions on the power market, or other functions.

As described above, not only the centralized electric power system 102, such as thermal power generation 102a, nuclear power generation 102b, and hydro power generation 102c, among others, but also generated power of the domestic power generation device 104 (solar power generation, wind power generation) may be accumulated in the power storage device 103. Accordingly, even though generated power of the domestic power generation device 104 fluctuates, it is possible to perform control fixing the power amount transmitted externally, or discharging as appropriate. For example, use is also possible in which power obtained by solar power generation is accumulated in the power storage device 103, and also late night power in which rates are inexpensive in the evening is accumulated in the power storage device 103, and the accumulated power is used by discharging by the power storage device 103 in a daytime time slot in which the charges are high.

Moreover, an example has been described where the control device 110 is accommodated in the power storage device 103; however, the device may also be accommodated in the smart meter 107, or may have an independent configuration. Furthermore, the power storage unit 100 may be used with a plurality of homes in a housing complex as a target, or may be used with a plurality of detached houses as a target.

[Power Storage Unit in Vehicle as Application Example]

Figure 15:
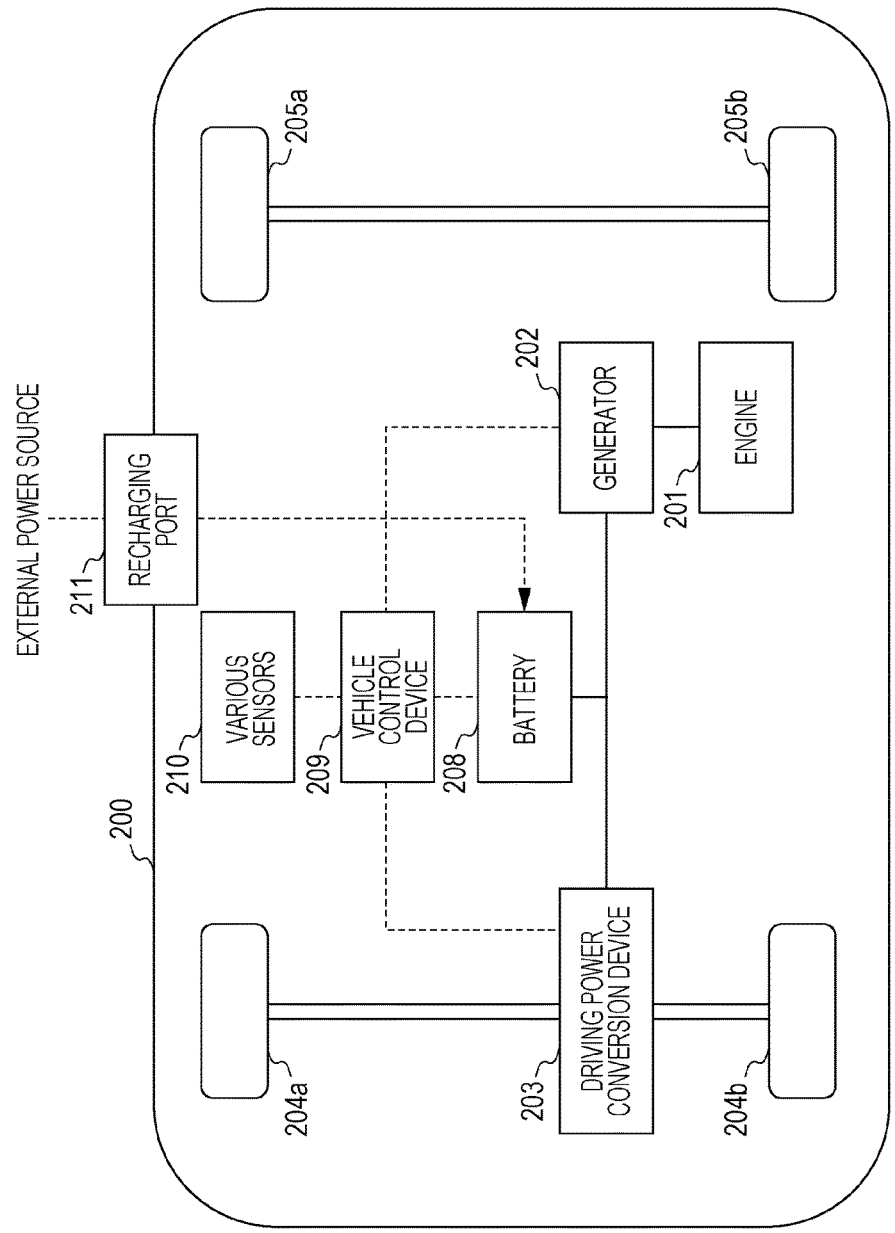
FIG. 15 is a diagram for describing an application example according to certain embodiments.

The present disclosure will be described with reference to FIG. 15 as an illustrative example applied to a power storage unit for use in a vehicle. In FIG. 15, embodiments of an example of a configuration of a hybrid vehicle employing a series hybrid system in which the present disclosure is applied is shown. A series hybrid system is a vehicle driven by a driving power conversion device using the power generated by a power generator operated by the engine, or power thereof temporarily accumulated in a battery.

An engine 201, a power generator 202, a driving power conversion device 203, a drive wheel 204a, a drive wheel 204b, a wheel 205a, a wheel 205b, a battery 208, a vehicle control device 209, various sensors 210, and a recharging port 211 are mounted in the hybrid vehicle 200. The power storage module 2 may be applied as the battery 208.

A hybrid vehicle 200 is frequently stored outside. In mountainous regions during the winter, there are cases where the outside air temperature lowers to approximately −20 degrees Celsius. Even in such an environment, it is possible to correctly discriminate the state of the battery 208 according to the present technology, and further, in a case where the performance of the battery 208 is deteriorated, it is possible to recover the performance thereof.

The hybrid vehicle 200 is driven with the driving power conversion device 203 as a driving source. A motor is one example of the driving power conversion device 203. The driving power conversion device 203 is operated by the power of the battery 208, and the torque of the driving power conversion device 203 is transferred to the drive wheels 204a and 204b. Moreover, the driving power conversion device 203 is applicable to an alternating current motor or a direct current motor by using direct current-alternating current (DC-AC) or reverse conversion (AC-DC conversion) at appropriate locations. The various sensors 210 control the number of engine revolutions via a vehicle control device 209; and control the opening degree (throttle opening degree) of a throttle valve (not shown in the diagrams). A velocity sensor, an acceleration sensor, a number of engine revolutions sensor or other sensors are included in the various sensors 210.

The torque of the engine 201 is transferred to the power generator 202, and it is possible to accumulate the power generated by the power generator 202 by the torque in the battery 208.

When the hybrid vehicle decelerates due to a braking mechanism not shown in the diagram, the resistance force during the deceleration is applied to the driving power force conversion device 203 as torque, and the regeneration power generated at the driving power conversion device 203 by this torque is accumulated in the battery 208.

By the battery 208 being connected to an external power source of the hybrid vehicle, the battery 208 can receive power supply from the external power source with the recharging port 211 as an input port, and it is possible to accumulate the received power.

Although not shown in the diagrams, an information processing device that performs information processing relating to vehicle control based on information relating to the secondary battery may be provided. As such, an information processing device, for example, information processing devices performing remaining battery capacity display based on information relating to the remaining capacity of the battery, among others, may be provided.

As a function of the vehicle control device 209, for example, functions of the main microcontrol unit 30 or other functions may be applied.

Moreover, above, a series hybrid vehicle driven by a motor using the power generated by a power generator operated by the engine, or power thereof temporarily accumulated in a battery has been described. However, the present disclosure may be applied with respect to a parallel hybrid vehicle with either of the output of an engine and a motor as the driving source, and using and appropriately switching between 3 methods of driving with the engine only, driving with the motor only and driving with both the engine and the motor. Furthermore, the present disclosure may also be applied with respect to a so-called electric vehicle driven by driving of the drive motor alone without using the engine.

The present disclosure contains subject matter related to that disclosed in Japanese Priority Patent Application JP 2012-263428 filed in the Japan Patent Office on Nov. 30, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 control system
2 power storage module
3 controller
4 recharging device
4a recharge voltage and recharge current control portion
5 load
5a discharge current control portion
15 temperature measurement portion
19 current detection resistance
20 current detection amplifier
22 warming portion
25 sub-microcontrol unit
30 main microcontrol unit
SMO submodule

The invention claimed is:

1. A battery package, comprising:
a battery; and
a central processing unit (CPU) configured to:
determine that an integrated recharging time of the battery, at temperatures lower than a threshold temperature, exceeds a threshold;

set a recovery mode based on the determination that the integrated recharging time of the battery exceeds the threshold;
determine a first temperature of the battery in the set recovery mode;
control discharge of the battery at a first discharge rate in the set recovery mode, wherein the discharge is controlled based on the first temperature of the battery that is higher than the threshold temperature;
determine a second temperature of the battery;
control a heating operation to heat the battery for a determined time period, wherein the heating operation is controlled based on the second temperature that is lower than the threshold temperature;
determine a third temperature of the heated battery; and
control the discharge of the battery at a second discharge rate, based on the third temperature of the heated battery that is higher than the threshold temperature.

2. The battery package of claim 1,
wherein the CPU is further configured to control deterioration of the battery based on a detection of the deterioration of the battery and the recovery mode.

3. The battery package of claim 2,
wherein a first capacity of the battery package is within 500 mAh of a second capacity of the battery package in a sequential set of 250-300 cycles, based on the battery package at the temperatures that is below −10 degrees Celsius for a sequential set of 0-300 cycles,
wherein the first capacity corresponds to a capacity of the battery package after the recovery mode and the second capacity corresponds to the capacity of the battery package before the recovery mode,
wherein the sequential set of 0-300 cycles includes the sequential set of 250-300 cycles, and
wherein each of the sequential set of 0-300 cycles comprises recharge of the battery and the discharge of the battery.

4. The battery package of claim 1, wherein the first discharge rate is a fixed rate.

5. The battery package of claim 1, wherein the first discharge rate is lower than 0.2C.

6. The battery package of claim 1, wherein the first discharge rate is between 0.2C and 0.1C.

7. The battery package of claim 1, wherein the first discharge rate is 0.1C.

8. The battery package of claim 1, wherein the CPU is further configured to control the discharge of the battery at a third discharge rate before the battery is heated.

9. The battery package of claim 8, wherein the third discharge rate is same as the first discharge rate.

10. The battery package of claim 8, wherein the third discharge rate is different from the first discharge rate.

11. The battery package of claim 8, wherein the first discharge rate is lower than 0.2C.

12. The battery package of claim 8, wherein the first discharge rate is 0.1C.

13. The battery package of claim 1, wherein the battery package further comprises a plurality of batteries, and the plurality of batteries include the battery.

14. The battery package of claim 13, wherein the CPU is further configured to:
determine an initial temperature of at least one battery of the plurality of batteries, wherein the initial temperature of the at least one battery is higher than the threshold temperature; and
control the discharge of the at least one battery of the plurality of batteries at a third discharge rate.

15. The battery package of claim 14, wherein the CPU is further configured to control the discharge of the plurality of batteries based on at least two different discharge rates for at least two different batteries of the plurality of batteries.

16. The battery package of claim 1, wherein the battery is configured to power an electronic device.

17. The battery package of claim 16, wherein the electronic device is a vehicle.

18. A power storage device, comprising:
battery; and
a central processing unit (CPU) configured to:
determine that an integrated recharging time of the battery, at temperatures lower than a threshold temperature, exceeds a threshold;
set a recovery mode based on the determination that the integrated recharging time of the battery exceeds the threshold;
determine a first temperature of the battery in the set recovery mode;
control discharge of the battery at a first discharge rate in the set recovery mode, wherein the discharge is controlled based on the first temperature of the battery that is higher than the threshold temperature;
determine a second temperature of the battery;
control a heating operation to heat the battery for a time period, wherein the heating operation is controlled based on the second temperature that is lower than the threshold temperature;
determine a third temperature of the heated battery; and
control the discharge of the battery at a second discharge rate, based on the third temperature of the heated battery that is higher than the threshold temperature.

19. A method of controlling power storage in a battery package, the method comprising:
determining that an integrated recharging time of a battery, at temperatures lower than a threshold temperature, exceeds a threshold;
setting a recovery mode based on the determination that the integrated recharging time of the battery exceeds the threshold;
determining a first temperature of the battery in the set recovery mode;
controlling discharge of the battery at a first discharge rate in the set recovery mode, wherein the discharge is controlled based on the first temperature of the battery that is higher than the threshold temperature;
determining a second temperature of the battery;
controlling a heating operation to heat the battery for a time period, wherein the heating operation is controlled based on the second temperature that is lower than the threshold temperature;
determining a third temperature of the heated battery; and
controlling the discharge of the battery at a second discharge rate, based on the third temperature of the heated battery that is higher than the threshold temperature.

20. A vehicle comprising a battery package,
wherein the battery package comprises:
a battery; and
a central processing unit (CPU) configured to:
determine that an integrated recharging time of the battery, at temperatures lower than a threshold temperature, exceeds a threshold;

set a recovery mode based on the determination that the integrated recharging time of the battery exceeds the threshold;

determine a first temperature of the battery;

control discharge of the battery at a first discharge rate, based on the first temperature of the battery that is higher than the threshold temperature;

determine a second temperature of the battery;

control a heating operation to heat the battery for a time period, wherein the heating operation is controlled based on the second temperature that is lower than the threshold temperature;

determine a third temperature of the heated battery; and control the discharge of the battery at a second discharge rate, based on the third temperature of the heated battery that is higher than the threshold temperature.

21. The battery package of claim 1, wherein based on one of the first temperature, the second temperature or the third temperature of the battery, the CPU is further configured to one of:

control recharge of the battery at a first recharge rate; or control the recharge of the battery at a second recharge rate that is lower than the first recharge rate.

22. The battery package of claim 21, wherein the CPU is further configured to one of:

control the recharge of the battery at the second recharge rate based on the first temperature of the battery that is between an initial temperature and a secondary temperature; or control the recharge of the battery at the first recharge rate based on the first temperature of the battery that is higher than the secondary temperature.

23. The battery package of claim 21, wherein the CPU is further configured to one of:

control the recharge of the battery at the first recharge rate based on the battery that reaches a full recharge voltage; or control the recharge of the battery at the second recharge rate based on the battery that reaches a second voltage lower than the full recharge voltage.

24. The battery package of claim 22, wherein the initial temperature is −10 degrees Celsius, and the secondary temperature is 0 degrees Celsius.

* * * * *